(12) United States Patent
Cho et al.

(10) Patent No.: US 9,743,047 B2
(45) Date of Patent: Aug. 22, 2017

(54) NETWORK CAMERA USING HIERARCHICAL EVENT DETECTION AND DATA DETERMINATION

(71) Applicant: CENTER FOR INTEGRATED SMART SENSORS FOUNDATION, Daejeon (KR)

(72) Inventors: Hyun Tae Cho, Daejeon (KR); Chong Min Kyung, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 348 days.

(21) Appl. No.: 14/285,536

(22) Filed: May 22, 2014

(65) Prior Publication Data

US 2014/0347478 A1 Nov. 27, 2014

(30) Foreign Application Priority Data

May 27, 2013 (KR) .......... 10-2013-0059752
Aug. 14, 2013 (KR) .......... 10-2013-0096570

(51) Int. Cl.
*H04N 7/18* (2006.01)
*G06Q 50/26* (2012.01)
*G08B 13/196* (2006.01)

(52) U.S. Cl.
CPC ....... *H04N 7/183* (2013.01); *G08B 13/19656* (2013.01); *G08B 13/19695* (2013.01); *H04N 7/188* (2013.01); *G06Q 50/265* (2013.01); *G08B 13/19613* (2013.01); *G08B 13/19671* (2013.01)

(58) Field of Classification Search
None
See application file for complete search history.

(56) References Cited

U.S. PATENT DOCUMENTS

| | | | | |
|---|---|---|---|---|
| 4,998,095 A * | 3/1991 | Shields | ............... | G08B 25/016 340/538 |
| 5,689,242 A * | 11/1997 | Sims | ............... | G08B 13/1409 340/568.3 |
| 6,556,208 B1 * | 4/2003 | Congdon | ............... | G06F 3/1454 345/520 |
| 6,894,461 B1 * | 5/2005 | Hack | ............... | G05F 1/70 307/82 |
| 7,366,123 B1 * | 4/2008 | Biederman | ............... | G06F 1/30 370/311 |
| 8,471,904 B2 * | 6/2013 | Clemens | ............... | G06F 21/71 348/143 |

(Continued)

*Primary Examiner* — Mohammad J Rahman
(74) *Attorney, Agent, or Firm* — Marshall, Gerstein & Borun LLP

(57) ABSTRACT

Provided is a network camera, including: an event detector configured to detect an event; an image sensor configured to capture an image in response to the detected event; a storage configured to store image data of the captured image; a transceiver configured to transmit and receive the image data over a network; a controller configured to control the event detector, the image sensor, the storage, and the transceiver, to select a single network mode from among a plurality of network modes based on whether power is supplied from an outside, and to configure the network based on the selected network mode; and a power source configured to supply the power to the event detector, the image sensor, the storage, the transceiver, and the controller.

6 Claims, 18 Drawing Sheets

(56) References Cited

U.S. PATENT DOCUMENTS

| | | | | |
|---|---|---|---|---|
| 8,726,155 B2* | 5/2014 | Fang | ................ | H04N 5/76 715/716 |
| 9,345,063 B2* | 5/2016 | Jain | ................ | H04W 88/06 |
| 2002/0087220 A1* | 7/2002 | Tveit | ................ | G05B 23/0283 700/22 |
| 2006/0053316 A1* | 3/2006 | Yamazaki | ................ | G06F 1/3203 713/300 |
| 2006/0256781 A1* | 11/2006 | Lewis | ................ | H03K 17/6872 370/357 |
| 2008/0001840 A1* | 1/2008 | Wong | ................ | H01Q 1/38 343/867 |
| 2008/0068457 A1* | 3/2008 | Clemens | ................ | G06F 21/71 348/143 |
| 2008/0211914 A1* | 9/2008 | Herrera | ................ | H04N 7/18 348/148 |
| 2009/0128303 A1* | 5/2009 | Hovav | ................ | G01D 21/00 340/286.01 |
| 2011/0102585 A1* | 5/2011 | Kao | ................ | H04N 7/18 348/143 |
| 2011/0237287 A1* | 9/2011 | Klein | ................ | H04M 3/42178 455/521 |
| 2011/0267471 A1* | 11/2011 | Lee | ................ | H04N 7/185 348/159 |
| 2012/0062123 A1* | 3/2012 | Jarrell | ................ | H05B 37/0245 315/131 |
| 2012/0087660 A1* | 4/2012 | Treyer | ................ | H04B 10/50 398/58 |
| 2012/0307055 A1* | 12/2012 | Li | ................ | H04N 7/181 348/143 |
| 2013/0027562 A1* | 1/2013 | Lee | ................ | H04N 7/181 348/159 |
| 2013/0045683 A1* | 2/2013 | Wang | ................ | H04B 5/0037 455/41.2 |
| 2013/0107041 A1* | 5/2013 | Norem | ................ | H04N 5/225 348/143 |
| 2013/0141543 A1* | 6/2013 | Choi | ................ | H04N 13/0203 348/47 |
| 2013/0176401 A1* | 7/2013 | Monari | ................ | H04N 5/2252 348/47 |
| 2013/0286846 A1* | 10/2013 | Atlas | ................ | H04L 45/34 370/236 |
| 2014/0039700 A1* | 2/2014 | Yamashita | ................ | G05B 11/01 700/286 |
| 2014/0115326 A1* | 4/2014 | Kim | ................ | H04L 29/06 713/160 |
| 2014/0313954 A1* | 10/2014 | Choi | ................ | H04W 52/0258 370/311 |
| 2014/0354821 A1* | 12/2014 | Monroe | ................ | H04N 7/18 348/159 |

* cited by examiner

Although emergency corresponding to level 8 is detected, bandwidth is insufficient to transmit high resolution/FPS

NETWORK CAMERA USING HIERARCHICAL EVENT DETECTION AND DATA DETERMINATION

CROSS-REFERENCE TO RELATED APPLICATION

This application claims the priority benefit of Korean Patent Application No. 10-2013-0059752, filed on May 27, 2013, and Korean Patent Application No. 10-2013-0096570, filed on Aug. 14, 2013, in the Korean Intellectual Property Office, the disclosure of which is incorporated herein by reference.

BACKGROUND

1. Field of the Invention

The present invention relates to a streetlight network camera using hierarchical event detection and data determination, and a network monitoring system including the streetlight network camera.

2. Description of the Related Art

Currently, according to an increase in various types of accidents, such as sexual crimes, thefts, and hit-and-run cases, for example, security cameras such as closed circuit televisions (CCTVs) have been installed in downtown based on residential areas. FIG. 1 illustrates a conventional monitoring system in which security cameras are connected over a network. Here, an image captured by such a security camera may be transmitted to a neighboring police office or a management center and may be used to prevent various types of crimes or to detect an accident.

A security camera needs to be capable of photographing a sufficient area and thus, is generally installed at a predetermined height of a telephone pole or a building. A streetlight may be used for installation of a security camera. In many cases, streetlights are regularly disposed at predetermined intervals. Thus, not to mention that it is possible to acquire images at predetermined intervals nearly all over the downtown, a power source to supply power to a streetlight may be used as a power source of a security camera.

However, in many cases, power is collectively supplied from the Korea Electric Power Corporation (KEPC) to streetlights based on, for example, a sunset time and thus, a security camera is embedded with a charging battery to be supplied with the power from the charging battery and perform a monitoring activity during the day. Accordingly, there is a need to operate the security camera with low power when capturing, storing, and transmitting an image during the day. Alternatively, in the case of a security camera that operates using a battery alone without being supplied with the power from an outside, the low-power operation may be further required.

In addition, the conventional security camera may determine whether to store an image through a primary determination of an image reader. Accordingly, even an important image may not be stored due to a significantly high determination standard. Alternatively, a relatively unimportant image may be frequently stored or transmitted due to a significantly low determination standard, which may lead to quickly using a storage space and a battery. Also, by occupying a network channel, the entire efficiency of a monitoring system may be degraded.

SUMMARY

An aspect of the present invention provides a streetlight network camera that may configure a network based on a single network mode selected from among a plurality of network modes and thereby enables mutual data transmission.

Another aspect of the present invention also provides a streetlight network camera that may operate in one of a low-power and low-speed network mode and a high-power and high-speed network mode based on whether power is supplied from an outside.

Another aspect of the present invention also provides a hierarchical event detector that may acquire, store, and transmit event data at an appropriate level based on peripheral situations and available resources.

Another aspect of the present invention also provides a method of determining target data that may determine quality of event data to acquire, store, and transmit an event signal at an appropriate level based on peripheral situations and available resources.

Another aspect of the present invention also provides a network monitoring system that may effectively transmit monitoring data during the day and night in conjunction with a streetlight network camera configured as above.

According to an aspect of the present invention, there is provided a streetlight network camera, including: an event detector configured to detect an event; an image sensor configured to capture an image in response to the detected event; a storage configured to store image data of the captured image; a transceiver configured to transmit and receive the image data over a network; a controller configured to control the event detector, the image sensor, the storage, and the transceiver, to select a single network mode from among a plurality of network modes based on whether power is supplied from an outside, and to configure the network based on the selected network mode; and a power source configured to supply the power to the event detector, the image sensor, the storage, the transceiver, and the controller.

According to another aspect of the present invention, there is provided a network monitoring system including: a streetlight network camera of the present invention; a streetlight network configured to connect the streetlight network camera to another streetlight network camera; an Internet; a sink configured to connect the streetlight network and the Internet; and a management center connected to the Internet.

According to still another aspect of the present invention, there is provided a hierarchical event detector, including: a first event detector configured to detect an event signal; a second event detector configured to calculate an event emergency class set as a plurality of levels from the event signal detected by the first event detector; a data determiner configured to determine a format of data so that a data rate per second increases according to an increase in a level of the event emergency class calculated by the second event detector; and a transceiver configured to transmit, to an outside transmission data of the format determined by the data determiner or to receive an external command.

According to yet another aspect of the present invention, there is provided a method of determining target data, the method including: detecting an event signal; calculating an event emergency class set as a plurality of levels from the event signal; and determining a format of data so that a data rate per second increases according to an increase in a level of the calculated event emergency class.

According to embodiments of the present invention, a streetlight network camera may enhance the utilization of equipment by transmitting only required image data to a management center over a high-power and high-speed network while operating a low-power and low-speed network and during the day in which power is not supplied from an outside.

According to embodiments of the present invention, a network monitoring system may have a widely distributed monitoring range by installing streetlight network cameras along regular alignments of streetlights and may not require a separate power supply device since the power is supplied from a streetlight.

According to embodiments of the present invention, a hierarchical event detector and a method of determining target data may transmit and store event data to be proportional to a level of an event emergency class and thus, may appropriately verify seriousness or importance of an event situation.

Also, event data of an appropriate level may be transmitted based on available resources and thus, energy may be saved and issues about a bandwidth of a network and a storage space may be relatively easily overcome.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
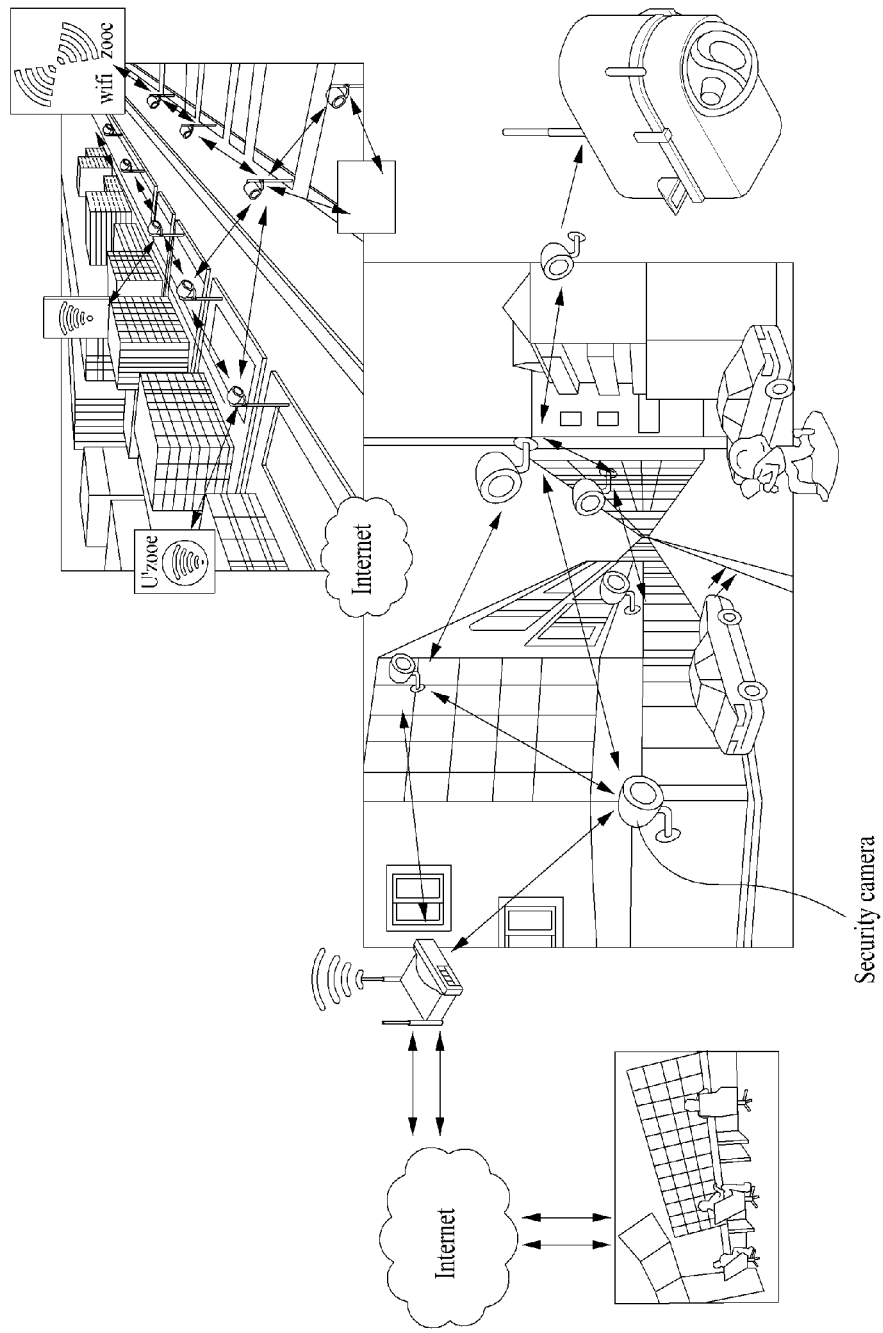
FIG. 1 illustrates a conventional monitoring system in which security cameras are connected over a network.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

Hereinafter, embodiments of a network camera configured to differently configure a network mode based on whether power is supplied from an outside and a monitoring system using the network camera will be described.

Figure 2:
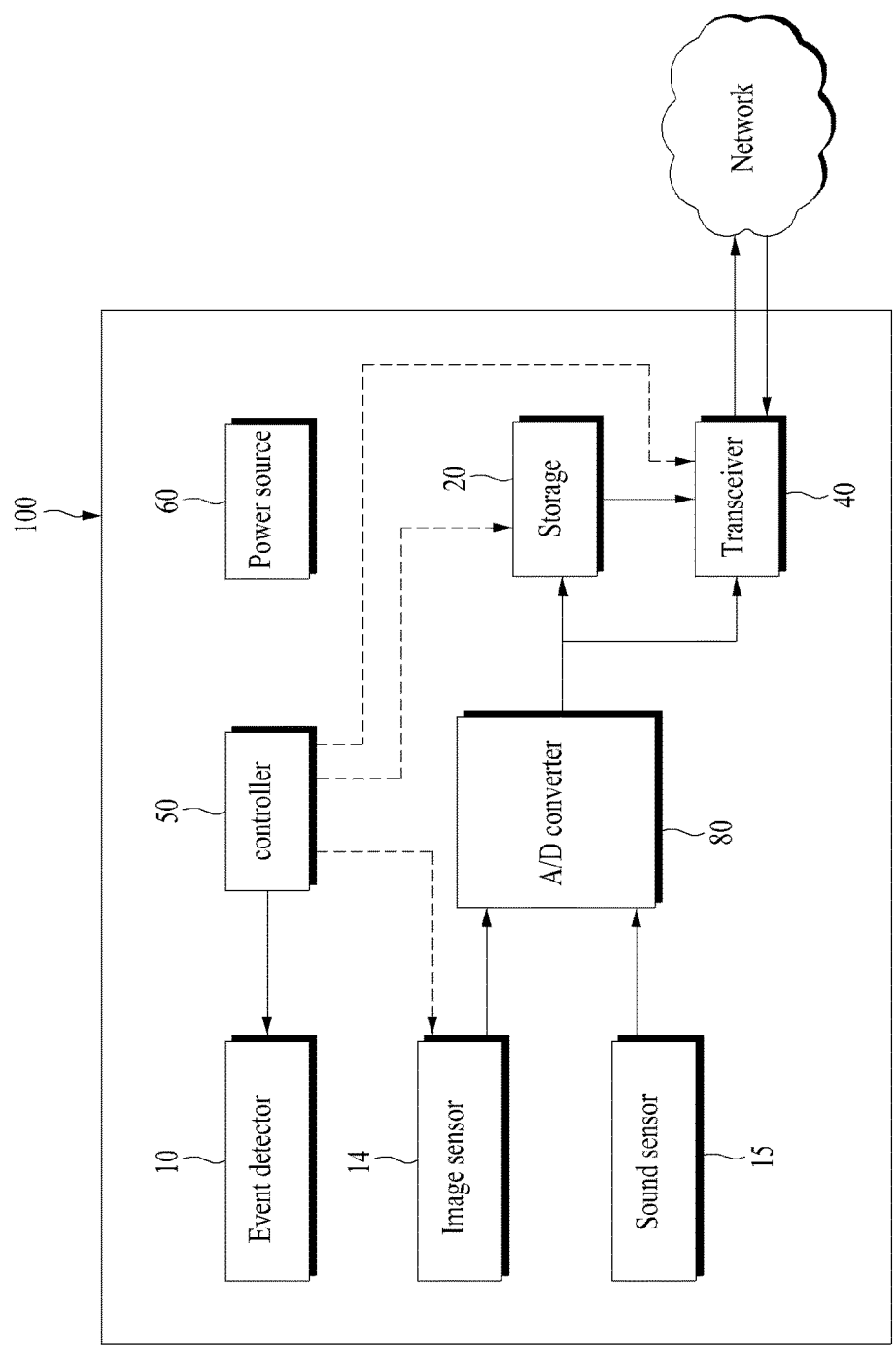
FIG. 2 illustrates a configuration of a streetlight network camera according to an embodiment of the present invention.

FIG. 2 illustrates a configuration of a streetlight network camera 100 according to an embodiment of the present invention.

Referring to FIG. 2, the streetlight network camera 100 may include an event detector 10 configured to detect an event in order to determine whether to perform image capturing; an image sensor 14 configured to capture an image in response to the detected event; a storage 20 configured to store image data of the captured image; a transceiver 40 configured to transmit and receive the image data over a network; a controller 50 configured to control the event detector 10, the image sensor 14, the storage 20, and the transceiver 40, to select a single network mode from among a plurality of network modes based on whether power is supplied from an outside, and to configure the network based on the selected network mode; and a power source 60 configured to supply the power to the event detector 10, the image sensor 14, the storage 20, the transceiver 40, and the controller 50. The streetlight network camera 100 may further include a sound sensor 15 configure to record a sound and an analog-to-digital (AD) converter 80 configured to convert an analog signal to a digital signal when the analog signal is received. Here, the controller 50 may select a single network mode from between a low-power and low-speed network mode and a high-power and high-speed network mode based on whether the power is supplied from the outside, and may configure the network based on the selected network mode. For example, the controller 50 may configure the network in the low-power and low-speed mode during a period of time in which the power is not supplied from a streetlight and may configure the network in the high-power and high-speed mode during a period of time in which the power is supplied from the streetlight.

Once a predetermined event is detected by the event detector 10, the streetlight network camera 100 may transmit, to the image sensor 14, a control signal for capturing an image. Image data of the captured image may be stored in the storage 20 or may be transmitted to a management center positioned at a remote distance through the transceiver 40, based on a determination of the controller 50 considering a storage capacity of the storage 20, a power supply capacity of the power source 60, and the like. In this example, transmission of data may be performed using a method of transferring data to still another streetlight network camera through a transceiver of another streetlight network camera of a node adjacent to the streetlight network camera 100, for example, by employing the other streetlight network camera as a wireless access point (AP). The data may be finally transferred to the management center.

Figure 3:
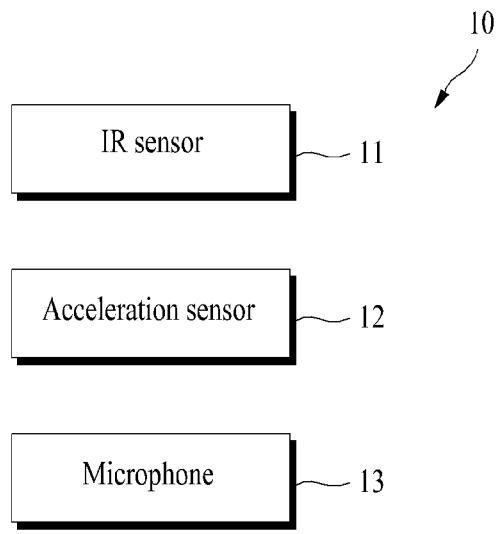
FIG. 3 illustrates a configuration of an event detector of FIG. 2.

The event detector 10 refers to a constituent element configured to generate an event detection signal by detecting an external event, and may detect, for example, a movement of a person, occurrence of impact, and occurrence of sound. FIG. 3 illustrates a configuration of the event detector 10 of FIG. 2. For example, the event detector 10 may include at least one of an infrared (IR) sensor 11, an acceleration sensor 12, and a microphone 13. In a case in which a human is detected by the IR sensor 11, in a case in which an external impact is detected by the acceleration sensor 12, or in a case in which a high-pitch voice or scream is detected by the microphone 13, the event detector 10 may transfer an event detection signal to the controller 50 so that the image sensor 14 may capture an image.

The image sensor 14 refers to a constituent element configured to capture an image in response to the detected event and to convert image data of the captured image to an electrical signal. In general, a couple charged device (CCD) or a complementary metal-oxide semiconductor (CMOS) image sensor (hereinafter, referred to as "CMOS image sensor and the like") may be employed. The streetlight network camera 100 needs to be capable of capturing an image during the day in which the power is not supplied to a streetlight and thus, may include a CMOS image sensor using a relatively small amount of power.

Figure 4:
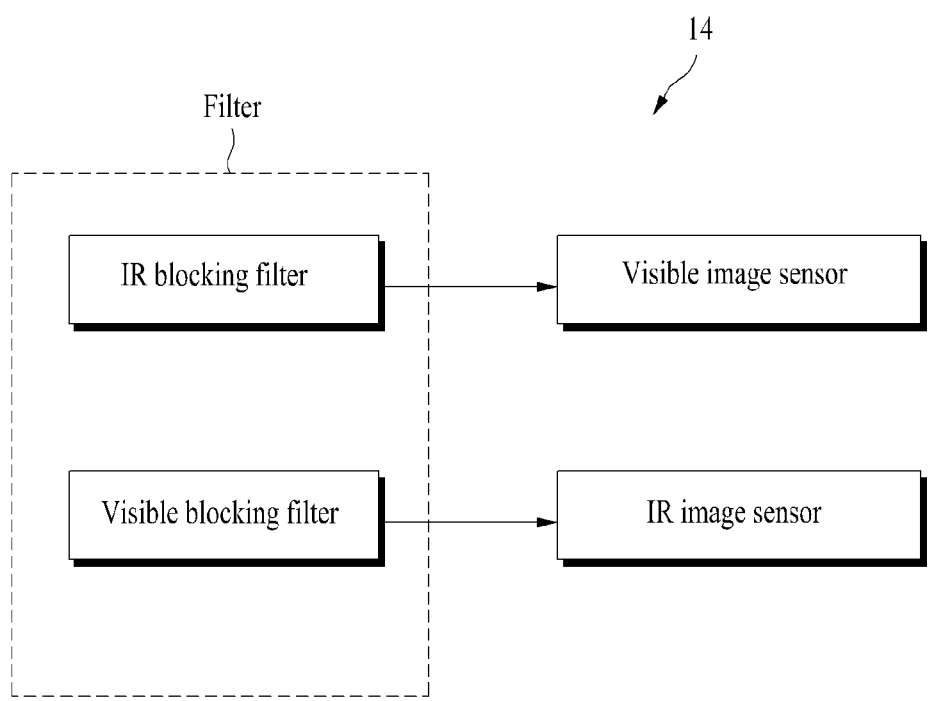
FIG. 4 illustrates a configuration of an image sensor of FIG. 2.

FIG. 4 illustrates a configuration of the image sensor 14 of FIG. 2. Referring to FIG. 4, the image sensor 14 may include a visible image sensor configured to capture a visible image and an IR image sensor configured to capture an IR image. In general, an image indicates an image visible to eyes of a person, for example, an image captured using visible rays. During the day, the quantity of light is sufficient and thus, a clear image may be captured. However, at night or in the case of rain, an image captured from a visible area may not be clear. In preparation of the above case, the image sensor 14 may include the IR image sensor to capture an IR image using both the IR image sensor and the visible image sensor or using only the IR image sensor at night or in the case of rain. In general, in an environment, such as at night or in the case of rain, in which a visible image cannot be readily captured, a clear IR image may be captured due to a relatively low temperature of the atmosphere or peripheral geographic features. Accordingly, a relatively great effect may be achieved by including the IR image sensor.

The image sensor 14 may further include a filter configured to capture a clear image. A CMOS image sensor and the like may convert energy of light having reached a semiconductor device to an electrical signal and thus, may capture an image regardless of distinguishing visible rays from IR rays. Accordingly, a primitive image captured by the CMOS image sensor and the like may appear as an electrical signal in which a visible image and an IR image are mixed. The primitive image may differ from the visible image or the IR image perceived to be natural by a person. Accordingly, the image sensor 14 may generate a natural image by further including a filter configured to filter visible rays or IR rays. Since light filtered by the filter needs to reach the visible image sensor or the IR image sensor, an IR blocking filter may be provided to the visible image sensor and a visible blocking filter may be provided to the IR image sensor.

A plurality of image sensors 14 may be provided so that a single streetlight network camera 100 of the present invention may capture a plurality of images each having a different direction and quality.

Figure 5:
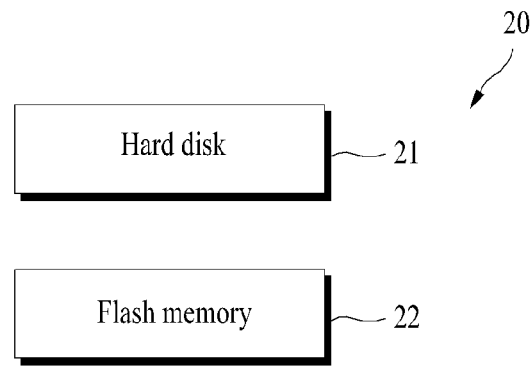
FIG. 5 illustrates a configuration of a storage of FIG. 2.

The storage 20 refers to a constituent element configured to store an image captured by the image sensor 14 as digital data. A specific type of the storage 20 may vary based on an amount of data that is to be stored by the streetlight network camera 100. FIG. 5 illustrates a configuration of the storage 20 of FIG. 2. In the case of storing a relatively large amount of data, a hard disk 21 may be provided. In the case of storing a relatively small amount of data, a flash memory 22 may be provided. The hard disk 21 uses a relatively large amount of power, however, has low cost per unit storage capacity (cost/gigabit (GB)). Thus, the hard disk 21 may be suitable to configure a large and inexpensive system since. The flash memory 22 uses a relatively small amount of power and thus, may be suitable to configure a system that needs to operate without being supplied with the power from an outside. Alternatively, the storage 20 may include all of the hard disk 21 and the flash memory 22, and may enable data to be stored in a suitable storage device based on an amount of data to be stored and a power state.

Figure 6:
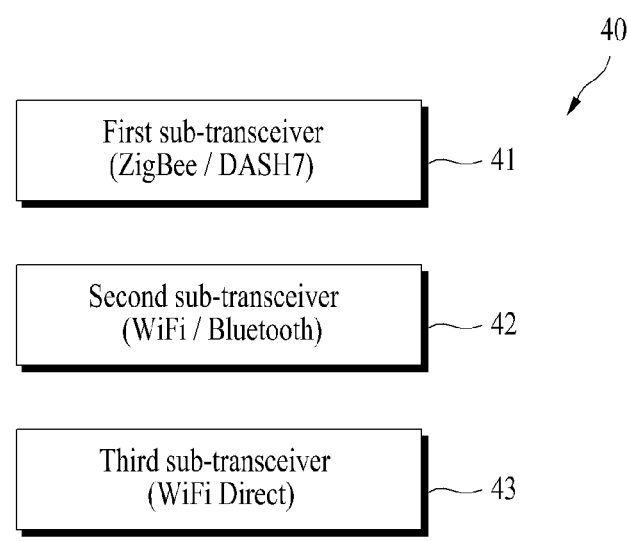
FIG. 6 illustrates a configuration of a transceiver of FIG. 2.

The transceiver 40 refers to a constituent element configured to transmit and receive data to and from an external device such as another streetlight network camera or a management center, and may include a plurality of sub-transceivers having different data transmission characteristics. FIG. 6 illustrates a configuration of the transceiver 40 of FIG. 2. Referring to FIG. 6, a first sub-transceiver 41 relates to a low-power and low-speed network mode and may be configured to transmit and receive data using ZigBee or DASH7 (hereinafter, referred to as "ZigBee and the like") protocol. A second sub-transceiver 42 relates to quick transmission of data, and may be configured to transmit and receive data using a wireless local area network (WLAN) or Bluetooth (hereinafter, referred to as "WLAN and the like") of a high-power and high-speed network mode. Here, the low-power and low-speed network mode and the high-power and high-speed network mode are relative concepts. Among a plurality of communication modes, a communication mode that is relatively low power and low speed may be operated by the first sub-transceiver 41 and a communication mode that is relatively high power and high speed may be operated by the second sub-transceiver 42. In general, a data rate less than 1 Mbps may be referred to as a low-speed network and a data rate greater than or equal 1 Mbps may be referred to as a high-speed network. Accordingly, the low-power and low-speed network mode may be defined as a communication mode less than 1 Mbps and the high-power and high-speed network mode may be defined as a communication mode greater than or equal to 1 Mbps.

In the case of the first sub-transceiver 41 using ZigBee and the like, low-power networking is possible and thus, the first sub-transceiver 41 may be used during the day in which external power is not supplied to the streetlight network camera 100. ZigBee and the like may be unsuitable to transmit a large amount of data due to a relatively low data rate of 250 kbps. However, during the day in which the external power is not supplied to the streetlight network camera 100, a probability that an image is to be captured due to an occurrence of an event such as a crime is relatively low compared to at night. Accordingly, a network monitoring system may be sufficiently possible using ZigBee and the like alone. A low-power network using ZigBee and the like may allow a delay tolerant network operation. Also, a link capacity, a hop count, and a distance may be used as metrics for routing. In addition, a residual amount of power remaining in a battery of the streetlight network camera 100 and an amount of energy used to transfer image data using a network link may also be considered.

In the case of capturing an image in response to an occurrence of an event, image data may be stored in the storage 20 during the day if a data amount of the captured image can be stored in the storage 20, and the stored image data may be transmitted to the management center using the high-power and high-speed network such as the WLAN and the like if power is supplied from a streetlight at night. However, if a data amount of the image captured in response to the occurrence of the event is too large to be stored in the storage 20, the image data may be transmitted to the management center by temporarily turning on and thereby activating the WLAN and the like and by using the activated WLAN and the like. In this example, a communication path through which the image data is transmitted may be determined based on a network topology configured using ZigBee and the like and thus, it is possible to minimize power consumption by the WLAN and the like.

Hereinafter, an example of configuring a network topology of ZigBee and the like will be described. The streetlight network camera 100 of the present invention may maintain and update information on a neighboring streetlight network camera by transmitting, to the neighboring streetlight network camera, a beacon message indicating a state of the streetlight network camera 100 through the first sub-transceiver 41. The beacon message may include information used to configure the network topology, for example, information on a shortest path or a hop count to a sink, a residual battery amount of the neighboring streetlight network camera, and an amount of time used to transmit image data. The information may be used when the streetlight network camera 100 selectively adopts a path.

Also, the low-power network of ZigBee and the like may transfer information on the high-speed network such as the WLAN and the like. For example, the WLAN and the like and the ZigBee and the like correspond to separately configured networks and thus, it is difficult to know a bandwidth of the WLAN. In this circumstance, in a case in which data is to be transmitted using the WLAN and the like during the day, if calculating and storing a bandwidth every time data is to be transmitted using the WLAN and the like, and including the bandwidth in a beacon message of ZigBee and the like and thereby transmitting the beacon message, the streetlight network camera 100 may calculate an available bandwidth by referring to a bandwidth history when using the WLAN. That is, the streetlight network camera 100 of the present invention may acquire a bandwidth of each communication channel. Accordingly, when transmitting image data at a high rate, a multipath method of dividing data into a plurality of pieces of data and thereby transmitting the same using a plurality of paths may be used.

Information on the high-speed network such as the WLAN and the like, included in the beacon message of the ZigBee and the like, may include sink or gateway information. Here, a sink or a gateway may refer to a node configured to connect a streetlight network and Internet. When the streetlight network camera 100 is connected to the sink or the gateway, image data may be transferred to the management center connected to the Internet. The streetlight network camera 100 connected to the sink or the gateway may transmit, to another streetlight network camera, the beacon message including sink or gateway information. In response to receiving the beacon message, the other streetlight network camera may calculate a hop count to a sink or a gateway, may include the calculated hop count in the beacon message and may transmit the beacon message to still another streetlight network camera. When the beacon message is transferred to the entire ZigBee network in this manner, each streetlight network camera may be aware of a sink or a gateway positioned around a corresponding streetlight network camera. Accordingly, image data may be quickly transmitted on the Internet through a plurality of sinks or gateways.

In the case of the second sub-transceiver 42 using the WLAN and the like, power consumption is large, however, high-speed networking is possible and thus, the second sub-transceiver 42 may be used when the external power is supplied to the streetlight network camera 100. The WLAN and the like may be suitable to transmit a large amount of data due to a relatively high data rate of a few through tens of Mbps. In particular, at night in which the external power is supplied to the streetlight network camera 100, a crime occurrence probability is relatively high, that is, an event occurrence probability is relatively high and an image is dark. Thus, the image sensor 14 needs to capture an image at high quality, which may lead to increasing an amount of image data. In this case, a high-speed network may be configured using the second sub-transceiver 42.

Although an example in which the transceiver 40 includes the first sub-transceiver 41 and the second sub-transceiver 42 is described above, the transceiver 40 may further include a third sub-transceiver 43 having a transmission characteristic different from the first sub-transceiver 41 and the second sub-transceiver 42. In this case, the transceiver 40 may enable data transmission and reception to be performed by an optimal sub-transceiver among the first sub-transceiver 41, the second sub-transceiver 42, and the third sub-transceiver 43 based on an amount of image data, a propagation state, and a power state. For example, the optimal sub-transceiver may be selected by the controller 50 by referring to a preset matching table. The matching table may be set by employing a time and a data generation amount per second as selection parameters. For example, the first sub-transceiver 41 configuring the low-power network may be selected during the day from 6:00 AM until 6:00 PM, the second sub-transceiver 42 may be selected when a data generation amount per second is less than or equal to 10 Mbps at night from 6:00 PM until 6:00 AM of the following day, and the third sub-transceiver 43 may be selected when a data generation amount per second exceeds 10 Mbps at night from 6:00 PM until 6:00 AM of the following day. In addition, the optimal sub-transceiver may be selected in such a manner that the controller 50 performs an operation by substituting a predetermined algorithm with parameters, for example, a time, a data generation amount per second, a transmission/reception channel state, and a residual battery amount.

The controller 50 refers to a constituent element configured to control the event detector 10, the image sensor 14, the storage 20, and the transceiver 40, and may include codec to encode image data or sound data.

As described above, the controller 50 may determine a data transmission/reception mode of the streetlight network camera 100. In the above example, the controller 50 may select a single sub-transceiver from among the first sub-transceiver 41, the second sub-transceiver 42, and the third sub-transceiver 43, and may transmit or receive data based on a protocol of the selected sub-transceiver. For example, the controller 50 may employ the first sub-transceiver 41 by configuring a network in a low-power and low-speed network mode during a period of time in which power is not supplied from a streetlight, may employ the second sub-transceiver 42 by configuring a network in a high-power and high-speed network mode during a period of time in which power is supplied from an outside. In this manner, the controller 50 may configure a data transmission/reception mode optimized for a day environment and a night environment. Here, for efficient power operation, the controller 50 may maintain the low-power and low-speed network mode during a period of time in which the power is not supplied from the streetlight and may switch from the low-power and low-speed network mode to the high-power and high-speed network mode and then quickly transmit image data when image data is to be transmitted.

Figure 7:
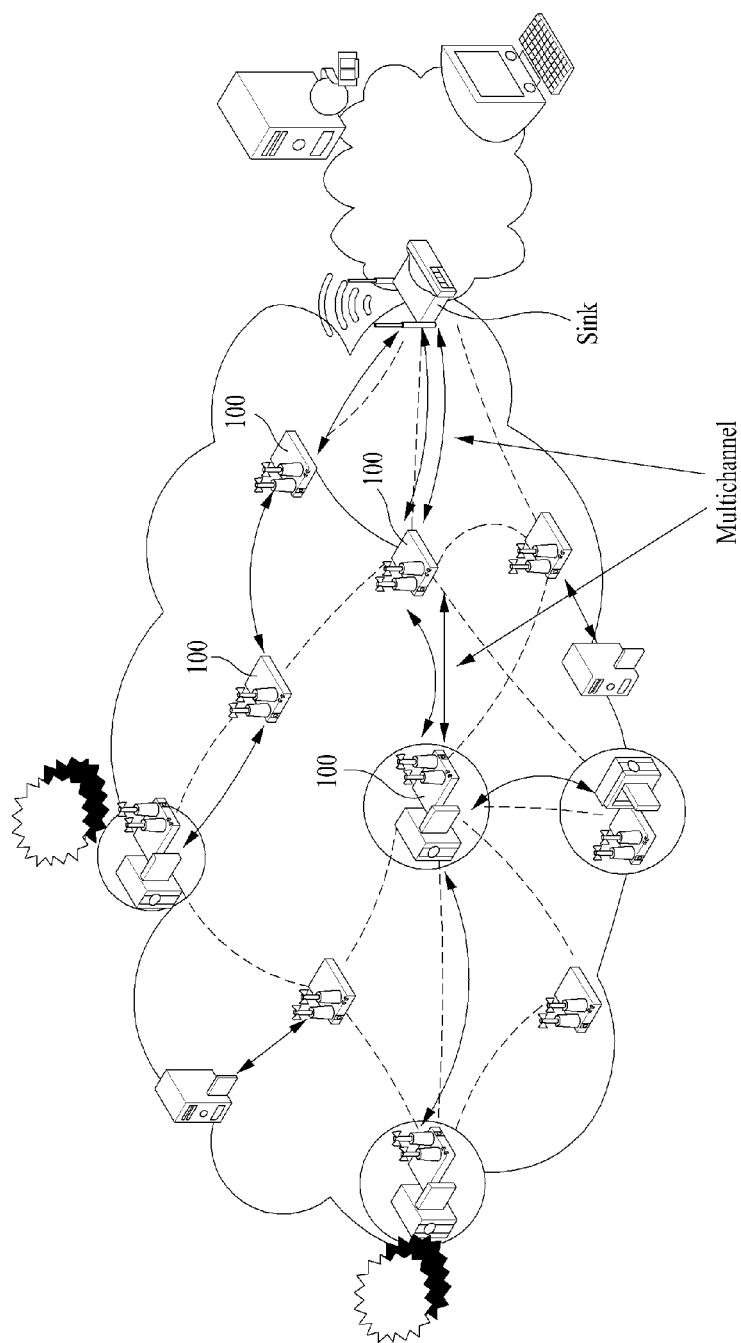
FIG. 7 illustrates an example of a multichannel control according to an embodiment of the present invention.
Figure 8:
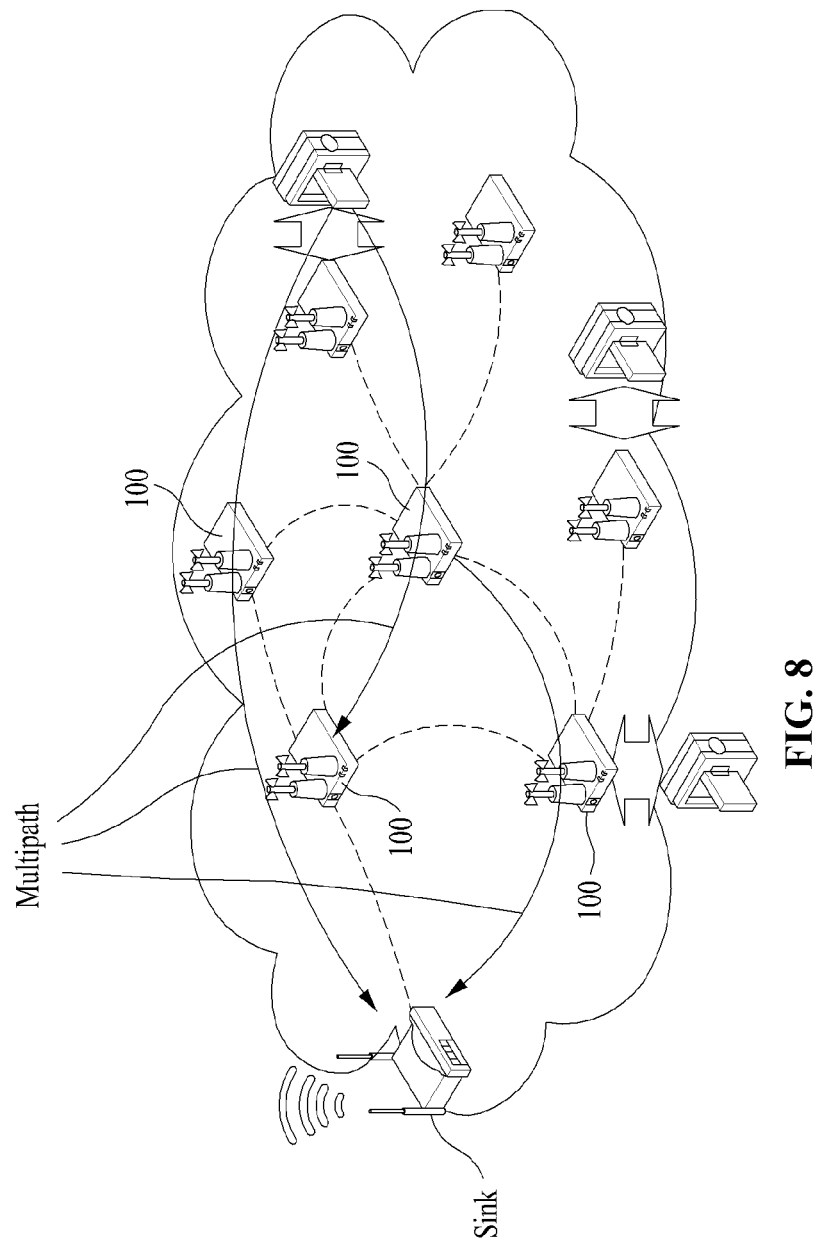
FIG. 8 illustrates an example of a multipath control according to an embodiment of the present invention.
Figure 9:
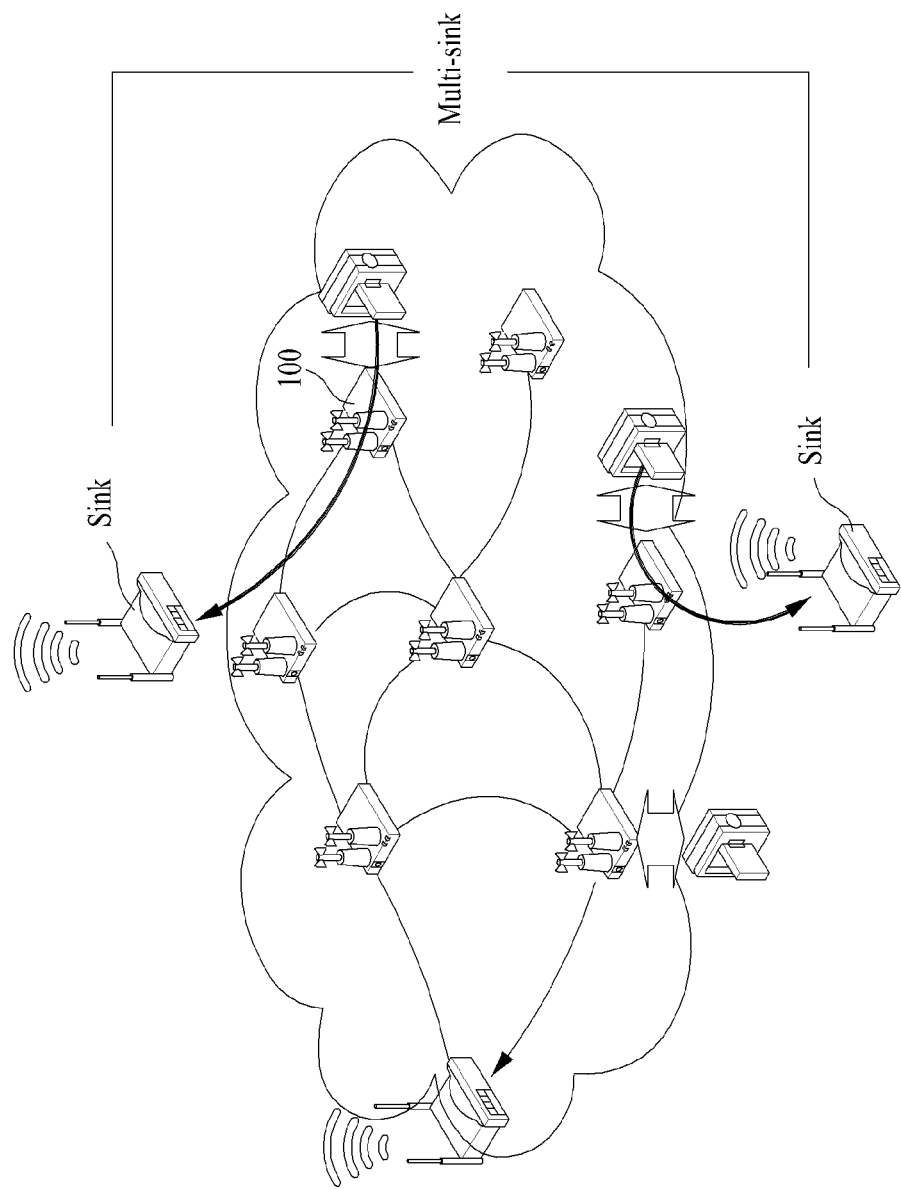
FIG. 9 illustrates an example of a multi-sink control according to an embodiment of the present invention.

The controller 50 may perform various controls based on a network state. FIG. 7 illustrates an example of a multi-channel control according to an embodiment of the present invention, FIG. 8 illustrates an example of a multipath control according to an embodiment of the present invention, and FIG. 9 illustrates an example of a multi-sink control according to an embodiment of the present invention.

The controller 50 may control a channel capacity based on a load amount of a network. When transmitting and receiving data using the second sub-transceiver 42, the controller 50 enables data to be smoothly transmitted using a multichannel in response to an increase in an amount of data. For example, when a third streetlight network camera transmits image data at 50 Mbps in a state in which a link capacity between the streetlight network camera 100 and another streetlight network camera adjacent thereto is 50 Mbps and image data is transmitted at 50 Mbps therebetween, a bottleneck situation may occur in a network and thus, image data cannot be transmitted in real time. Here, a multichannel may be used. That is, when overload occurs in a network while image data is being transmitted using a first frequency between two adjacent streetlight network cameras, a channel capacity may be increased by transmitting image data using a second frequency.

The controller 50 enables data to be transferred to a sink or a gateway through a multipath on a streetlight network in order to decrease a network load and to quickly transfer image data. Here, the overall network load may be decreased by distributing transmission of data to a plurality of communication links.

The controller 50 enables data to be distributedly transmitted to the Internet through a plurality of sinks or a plurality of gateways. Image data recorded by the streetlight network camera 100 needs to be transmitted to the Internet. Here, if data is transmitted through a single sink or a single gateway positioned at a remote distance, a bottleneck situation may occur and network resources may be inefficiently used while the data is being transferred to the sink or the gateway.

To prevent the above situations, the controller 50 enables data to be distributed and thereby quickly transmitted to an Internet network using a plurality of public wireless fidelity (Wi-Fi) APs installed around streetlights.

Settings of a multichannel, a multipath, and a multi-sink may be performed by a controller of each streetlight network camera by transferring a beacon message of ZigBee and the like during the day and by transferring the beacon message using the WLAN and the like at night, based on a power supply state. A transmission mode may be determined based on a matching table or by substituting parameters for a predefined algorithm.

Figure 10:
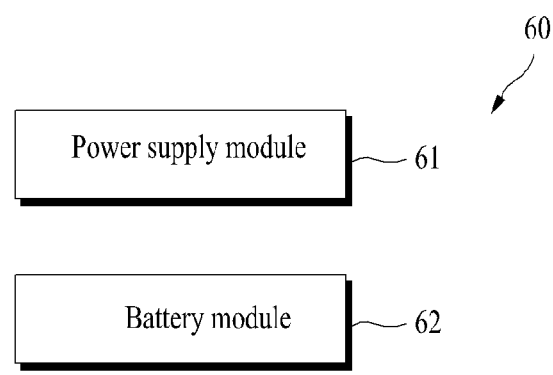
FIG. 10 illustrates a configuration of a power source of FIG. 2.

FIG. 10 illustrates a configuration of the power source 60 of FIG. 2. The power source 60 refers to a constituent element configured to supply power to the streetlight network camera 100, and may include a power supply module 61 configured to be directly supplied with the power from a wire lead in a streetlight and a battery module 62 configured to store the power. The streetlight network camera 100 needs to be directly supplied with the power from the streetlight at night in which the power is supplied to the streetlight, and needs to autonomously supply the power during the day in which the power is not supplied and thus, may include the power supply module 61 and the battery module 62.

The power supply module 61 refers to a constituent element configured to convert alternating current (AC) supplied from the streetlight to direct current (DC) and to supply the converted DC to the streetlight network camera 100. In general, electronic equipment such as communication equipment and video equipment uses DC power, which applies to the streetlight network camera 100 of the present invention. The DC needs to be supplied to the event detector 10, the image sensor 14, the storage 20, the transceiver 40, and the controller 50 and thus, the power supply module 61 may include an AC-to-DC (AD/DC) converter configured to convert the AC supplied from the streetlight to the DC.

The battery module 62 refers to a constituent element configured to store AC energy supplied from the streetlight and to supply the AC energy as DC. In general, power is not supplied to the streetlight during the day and thus, the battery module 62 may be charged at night in which the power is supplied to the streetlight and may supply AC during the day in order to operate the streetlight network camera 100 even during the day. For example, a lithium based battery or a lead-acid battery may be employed for the battery module 62. For example, in a situation in which an installation environment of the streetlight network camera 100 needs to use most of energy stored in the battery module 62 due to frequent event occurrences during the day, the lithium based battery having a relatively large number of charging and discharging times and an excellent discharging property may be used. Conversely, in a situation in which only a portion of energy stored in the battery module 62 is periodically used, the lead-acid battery being inexpensive, having a relatively low discharging property, that is, a relatively small amount of discharging, and having a long lifespan may be used.

In addition, the battery module 62 may be supplied with power using a variety of methods. For example, the battery module 62 may be supplied with power produced when vehicles pass by installing a piezoelectric device around the streetlight, and may be supplied with power from a solar panel by installing the solar panel to the streetlight. In general, the streetlight is installed on the roads on which vehicles pass and maintains a predetermined height and thus, geographic features to prevent the solar light are relatively absent. Accordingly, the power supply by the piezoelectric device or the solar panel may be easily performed.

The sound sensor 15 refers to a constituent element configured to record sound when the streetlight network camera 100 captures an image, thereby enabling a crime or an accident situation to be further clearly verified. For example, the sound sensor 15 may be the microphone 13. When the event detector 10 includes the microphone 13, the microphone 13 of the event detector 10 may also function as the sound sensor 15.

The A/D converter 80 refers to a constituent element configured to convert an analog signal to a digital signal when the analog signal is received from the image sensor 14 or the sound sensor 15, and may be omitted when an output signal of the image sensor 14 or the sound sensor 15 is a digital signal. A type of a signal processed by the storage 20, the transceiver 40, the controller 50, and the like is a digital signal and thus, when an analog signal is input from an outside, the A/D converter 80 is required.

Hereinafter, a network monitoring system using a streetlight network camera according to an embodiment of the present invention will be described.

Figure 11:
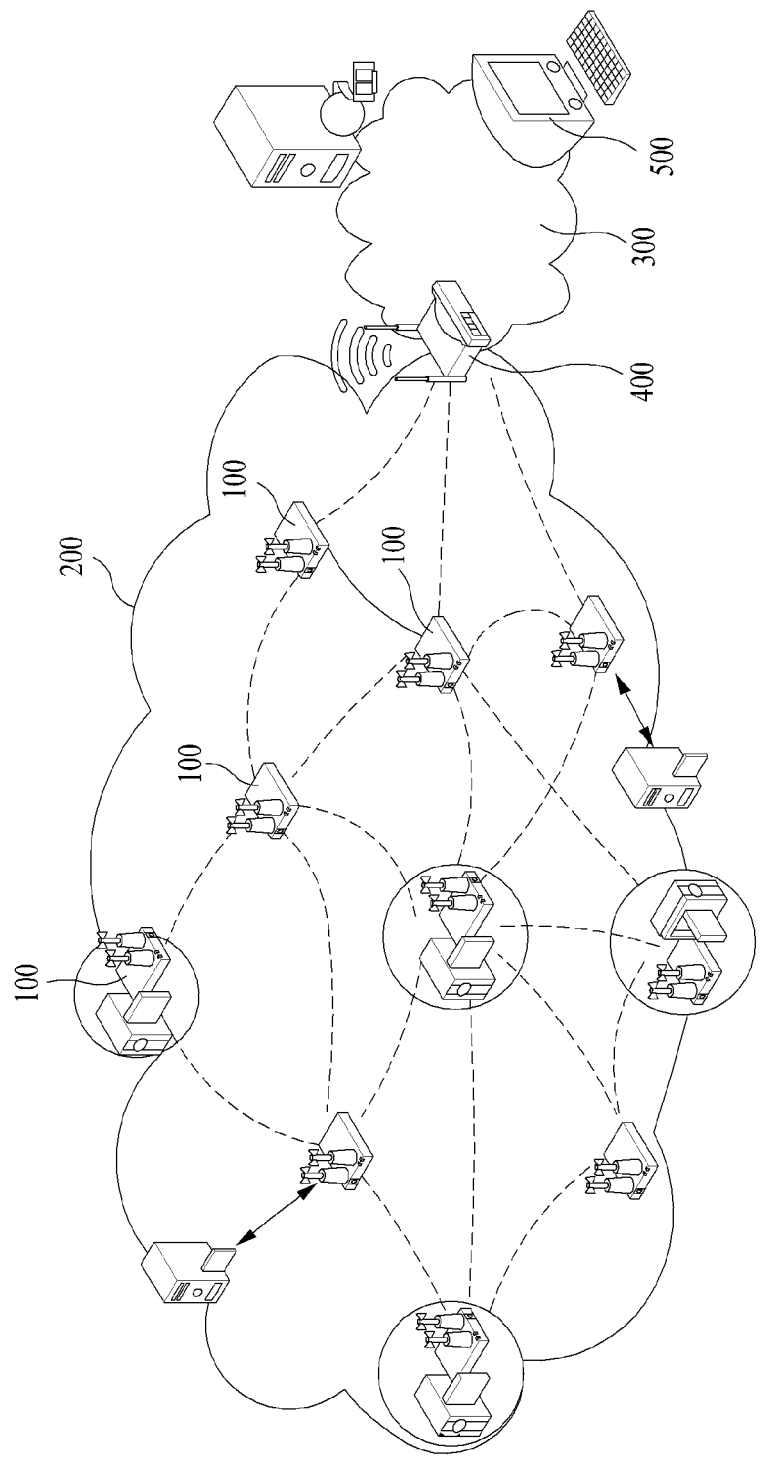
FIG. 11 illustrates a configuration of a network monitoring system using a streetlight network camera according to an embodiment of the present invention.

FIG. 11 illustrates a configuration of a network monitoring system using the streetlight network camera 100 according to an embodiment of the present invention. Referring to FIG. 1, the network monitoring system may include the streetlight network camera 100, a streetlight network 200 configured to connect a plurality of streetlight network cameras 100 to each other; an Internet 300; a sink 400 configured to connect the streetlight network 400 and the Internet 300; and a management center 500 connected to the Internet 300. Here, the sink 400 may be a Wi-Fi AP. The streetlight network 200 may be configured as a low-power and low-speed network of ZigBee and the like during a period of time in which power is not supplied from the streetlight and may be configured as a high-power and high-speed network of a WLAN and the like during a period of time in which the power is supplied.

Referring to FIG. 11, when the streetlight network camera 100 included in the network monitoring system detects an event and captures an image, data may be transmitted by employing the streetlight network camera 100 as a wireless AP through the streetlight network 200, which is indicated as a bold arrow indicator. For quick transmission to the Internet 300, data may be transmitted by finding the sinks 400 formed in the streetlight network 200 and may also be transmitted using a multichannel or a multipath. Data transmitted to the sink 400 may be transmitted to the management center 500 through the Internet 300. Transmission of data may be performed over a high-speed WLAN and the like. When the network monitoring system using the streetlight network camera 100 is in a low-power mode, a network may be configured using ZigBee and the like. Only when data is to be transmitted, data may be transmitted by turning on the WLAN and the like. Accordingly, it is possible to maximize a device running time, that is, to achieve an efficient power operation during a period of time in which the external power is not supplied to the streetlight network camera 100.

The efficient power operation may be achieved by enabling the controller 50 to change a resolution of an image captured by the image sensor 14 or to adjust an amount of data to be transmitted by the transceiver 40. Except for a case in which no particular power limit is applied due to power supply from the streetlight, there is need to differently operate the streetlight network camera 100 based on a residual battery amount during the day in which the power is supplied from the battery module 62. That is, it is possible to increase an operation time of the streetlight network camera 100 by establishing a negative correlation between a residual battery amount and a resolution of a captured image, and thereby capturing an image at a high resolution when the residual battery amount is relatively large and capturing an image at a gradually low resolution according to a decrease in the residual battery amount. Also, it is possible to increase an operation time of the streetlight network camera 100 by establishing a negative correlation between a residual battery amount and an amount of image data to be transmitted, and thereby transmitting non-compressed data when the residual battery amount is relatively large and transmitting data of a gradually high compression rate according to a decrease in the residual battery amount.

For example, when a residual battery amount is greater than or equal to 80%, or when power is supplied from the streetlight, an image may be recorded at a resolution of an ultrahigh definition (UHF) level. When a residual battery amount is 50% through 80%, an image may be recorded at a resolution of a high definition (HD) level. When a residual battery amount is 30% through 50%, an image may be recorded at a resolution of a video graphics array (VGA) level. When a residual battery amount is less than 30%, recording of an image may not be performed and only information on a detected event may be transferred to a neighboring streetlight network camera to perform recording by proxy. Alternatively, when a residual battery amount is greater than or equal to 80%, or when power is supplied from the streetlight, UHD image data may be transmitted. When a residual battery amount is 50% through 80%, UHD image data may be compressed to be an HD capacity and then be transmitted. When a residual battery amount is 30% through 50%, the image data may be compressed to be a VGA capacity and then be transmitted. When a residual battery amount is less than 30%, data may be stored in the storage 20 without being transmitted and may be transmitted to a neighboring streetlight network camera when power is supplied form the streetlight at night. That is, in a case in which high capacity data is transmitted from a neighboring streetlight network camera to the corresponding streetlight network camera 100, however, a residual battery amount of the corresponding streetlight network camera 100 is relatively small, the data may be compressed and transmitted, or may be initially stored in the storage 20 and then be transmitted to another neighboring streetlight network camera when the power is supplied from the streetlight at night.

A further intelligent network monitoring system may track a monitoring target and capture an image of the monitoring target. For example, when a first streetlight network camera detects an event and captures an image, the first streetlight network camera may transmit a signal noticing an event detection to a second streetlight network camera positioned at a 1-hop distance on a network. When the second streetlight network camera detects an event, the second streetlight network camera may also transmit a signal noticing an event detection to a third streetlight network camera positioned at a 1-hop distance. By consecutively applying the above method, it is possible to track a path through which the event has occurred. Also, by applying a prediction algorithm to event path data, it is possible to estimate an approximate range of a streetlight network camera in which an event may occur in the future. Accordingly, it is possible to further efficiently perform network monitoring. When a streetlight network camera included in the network monitoring system is in a sleep mode of a standby state, only a streetlight network camera present in a predicted event path may be required to be woken up. Accordingly, the entire energy efficiency of the network monitoring system may be significantly enhanced.

Also, the network monitoring system according to an embodiment of the present invention may be efficiently operated by adjusting a scale of a network. For example, in the case of a multi-hop, an amount of traffic in a network increases, however, a short distance communication is enabled with low power. In the opposite case, although a relatively large amount of energy is used due to an increase in a transmission distance, a relatively small number of streetlight network cameras may be used for networking or to transmit and receive image information, thereby decreasing an amount of traffic occurring in the network and guaranteeing a quality of service (QoS). Accordingly, the first case may be advantageous during the day in which there is no limit on power supply and an amount of transmission data is relatively small. The second case may be advantageous at night in which power is supplied from the streetlight and an amount of transmission data is relatively large.

Hereinafter, a hierarchical event detector configured to perform hierarchical event detection and data determination and a method thereof according to an embodiment of the present invention will be described. Here, the hierarchical event detector may refer to the aforementioned event detector. Accordingly, the first event detector 16 and the second event detector 17 described in the following may be included in the aforementioned event detector.

Figure 12:
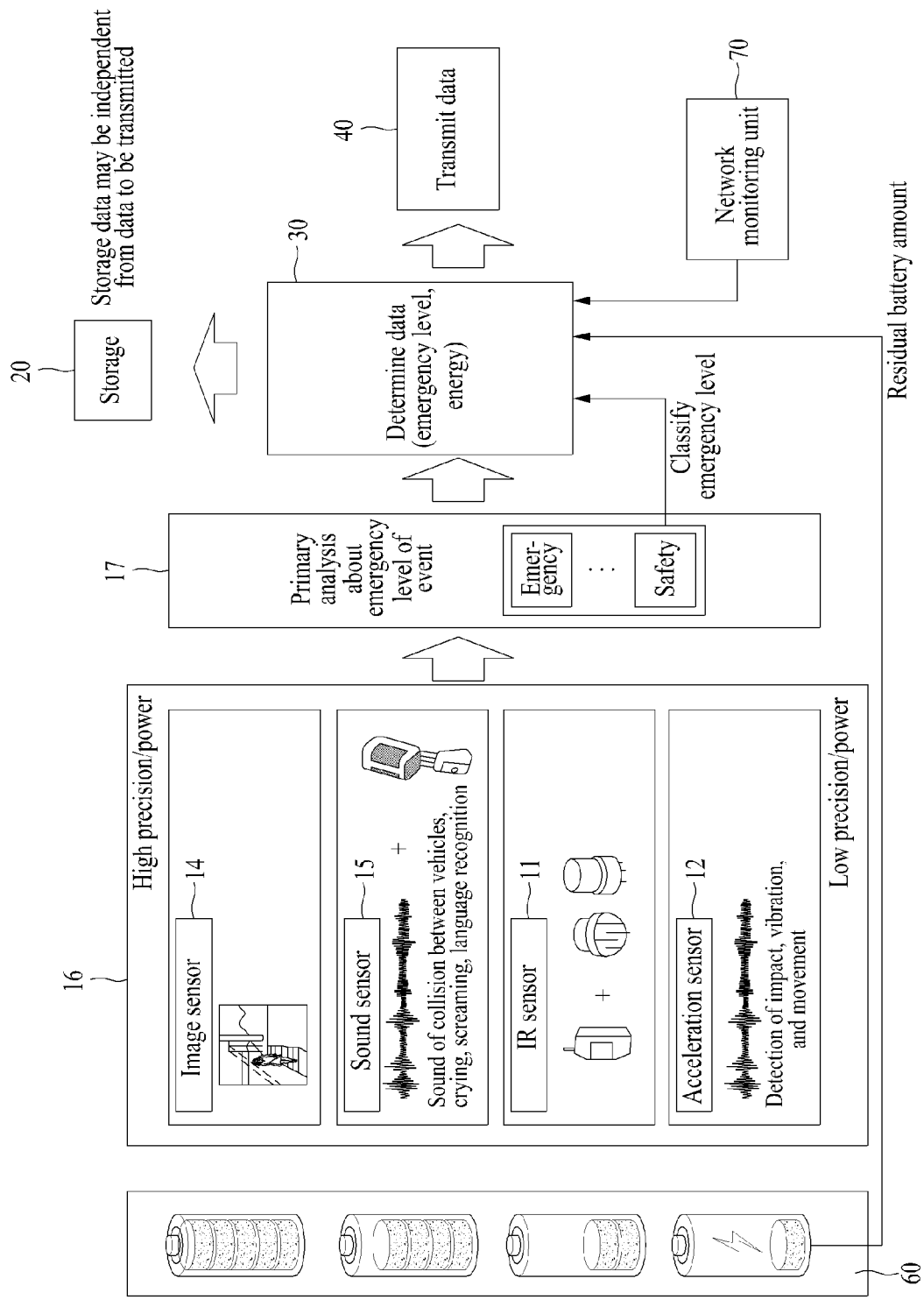
FIG. 12 illustrates a configuration of a hierarchical event detector according to an embodiment of the present invention.

FIG. 12 illustrates a configuration of a hierarchical event detector according to an embodiment of the present invention.

Referring to FIG. 12, the hierarchical event detector may include the first event detector 16, the second event detector 17, the data determiner 30, and the transceiver 40, and may further include the power source 60, the storage 20, a network monitoring unit 70, and a setting controller 90.

In the hierarchical event detector, when the first event detector 16 detects an event signal and the second event detector 17 determines an event emergency class, the data determiner 30 may determine a format of data to be transmitted through the transceiver 40 based on the event emergency class. When the storage 20 is further included, the data determiner 30 may determine a format of data to be stored in the storage 20 based on a residual storage capacity of the storage 20. The power source 60 is a selective constituent element since a configuration of the hierarchical event detector calculating the event emergency class is a technical spirit that may be more efficient in an energy limited case, that is, in a case in which power is supplied from the power source 60 without using an external power source, however, that may be sufficiently applied in a case in which power is supplied from an outside. Hereinafter, a configuration in which the power source 60 is included is described. A configuration in which the hierarchical event detector is supplied with the power from an outside and a case in which a residual mount of the power source 60 is insufficient will be replaced with an energy saving state. A case in which a residual amount of the power source 60 is sufficient will be replaced with an opposite state.

The first event detector 16 refers to a constituent element configured as a simple sensor capable of detecting an image, sound, heat, and vibration, and to detect a peripheral situation around the hierarchical event detector, for example, an event signal. The first event detector 16 may include at least one of the image sensor 14 configured to detect an image signal, the sound sensor 15 configured to detect a sound signal, and the acceleration sensor 12 configured to detect a vibration/mobile signal. Hereinafter, the image sensor 14, the sound sensor 15, and the acceleration sensor 12 may also be referred to as sensors. When the first event detector 16 includes a plurality of sensors, a detection sensor may be selectively used based on a residual amount of the power source 60. For example, when a residual amount of the power source 60 is sufficient, it is possible to detect a peripheral situation using the image sensor 14 having an excellent event detection performance although a large amount of energy is used. When a residual amount of the power source 60 is insufficient, it is possible to detect a peripheral situation using the sound sensor 15 or the acceleration sensor 12 except the image sensor 14. A driving type of a sensor based on a residual amount of the power source 60 may be preset. For example, when the power source 60 is in a fully charged state, all the sensors may be set to be driven. When the power source 60 is in a half-discharged state, only the image sensor 14 may be set to be driven or all of the sound sensor 15, the IR sensor 11, and the acceleration sensor 12 may be set to be driven. When the power source 60 is mostly discharged, only the sound sensor 15 may be set to be driven. That is, the first event detector 16 may be variably set based on a level of energy supply.

Figure 13:
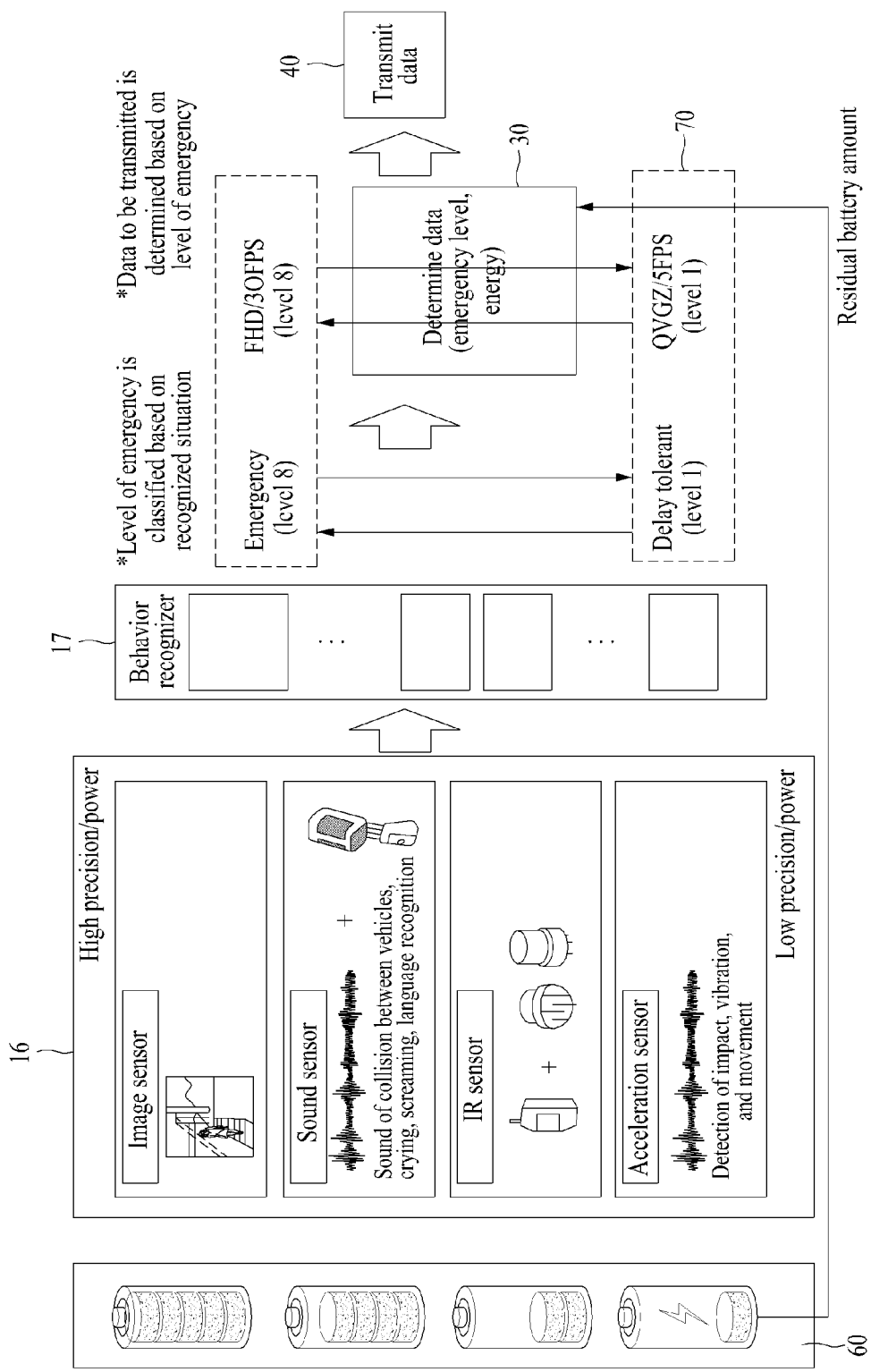
FIG. 13 illustrates a mechanism of a second event detector to determine an event emergency class according to an embodiment of the present invention.

The second event detector 17 refers to a constituent element configured to determine an event emergency class set as a plurality of levels, from the event signal detected by the first event detector 16, and may include at least one of an emergency analyzer 18 and a behavior recognizer 19. FIG. 13 illustrates a mechanism of a second event detector to determine an event emergency class according to an embodiment of the present invention. Here, the event emergency class indicates an emergency level of an event that may be verified from an event signal detected by sensors. For example, in a case in which the event emergency class is set as eight levels, level 1 may be set as a case in which a normal walk of a person and normal noise are detected, level 5 may be set as a case in which quick motion such as physical fight and high pitch of 90 dB or more are detected, and level 8 may be set as a case in which a sexual assault, a hit-and-run accident, and a vibration corresponding to an earthquake are detected. The number of levels of the event emergency class and a specific type of each level may be appropriately set based on an installation environment of the hierarchical event detector.

Figure 14:
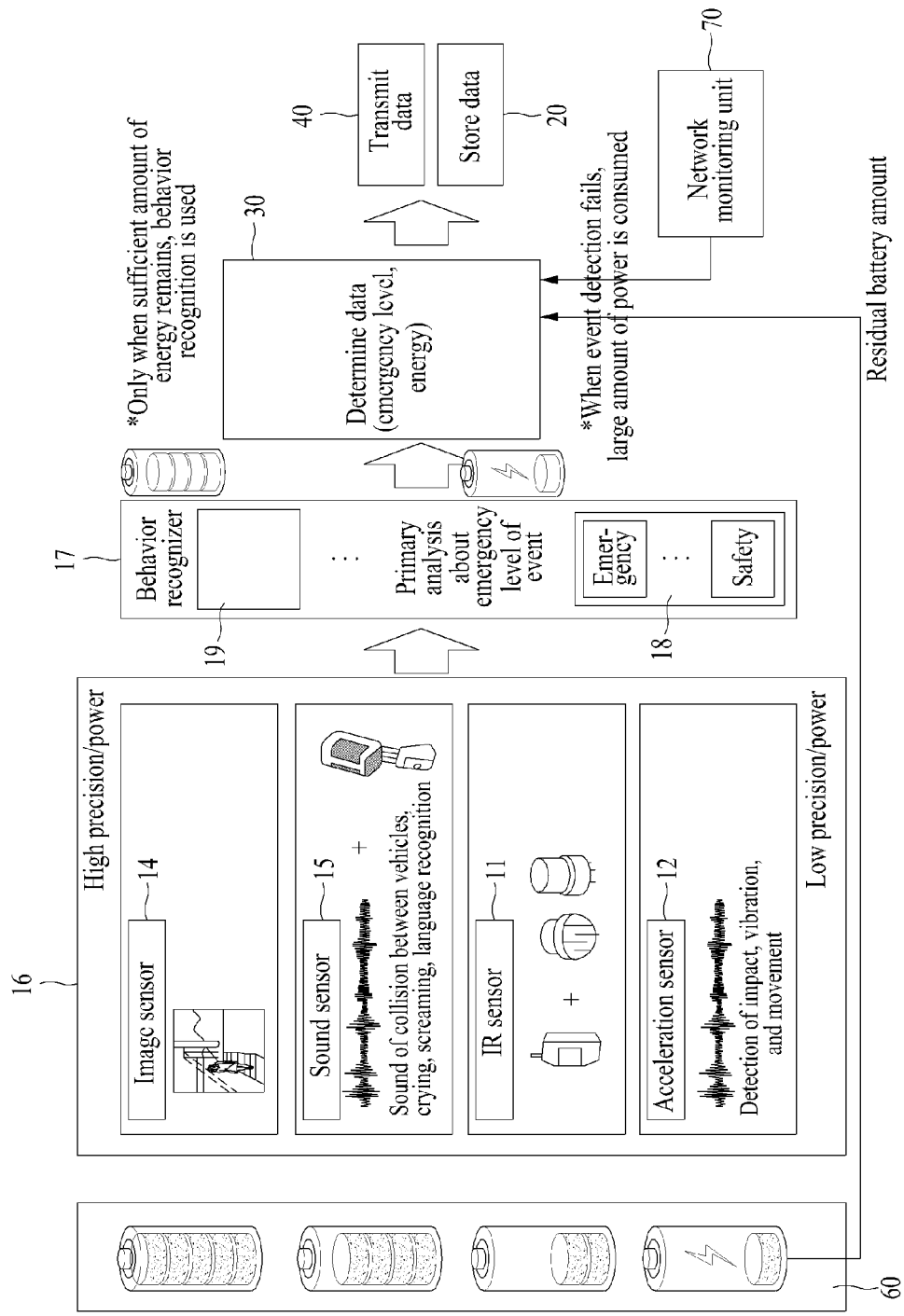
FIG. 14 illustrates a mechanism of a hierarchical event detector including an emergency analyzer and a behavior recognizer according to an embodiment of the present invention.

FIG. 14 illustrates a mechanism of a hierarchical event detector including the emergency analyzer 18 and the behavior recognizer 19 according to an embodiment of the present invention.

The emergency analyzer 18 refers to a constituent element configured to directly calculate an emergency level from various types of event signals detected by the first event detector 16, for example, an image signal, a sound signal, a thermal signal, and a vibration signal. The emergency analyzer 18 may calculate an event emergency class from an event signal detected by sensors using a one-to-one matching method. For example, in a case in which the first event detector 16 detects an event by driving the image sensor 14, the emergency analyzer 18 may immediately calculate the event emergency class from the event signal by determining the event emergency class as level 1 when an image change rate per second is less than 1%, by determining the event emergency class as level 2 when an image change rate per second is greater than or equal to 1% and less than 3%, and by determining the event emergency class as level 3 when an image change rate per second is greater than or equal to 3% and less than 7%. In this example, the image change rate per second denotes a change rate between the entire image detected by the image sensor 14 and the entire image detected one second ago. In the case of sound, the emergency analyzer 18 may calculate the event emergency class by determining sound less than 40 dB as level 1 and by determining sound greater than or equal to 40 dB and less than 50 dB as level 2. The above method of calculating the event emergency class may be applied alike to the IR sensor 11 and the acceleration sensor 12.

Although an example of calculating an event emergency class from each sensor is described, the event emergency class may be determined from an event signal detected by a plurality of sensors. For example, a case in which an image change rate per second is greater than or equal to 3% and less than 7% and sound is greater than or equal to 50 dB and less than 60 dB, or a case in which an image change rate per second is greater than or equal to 7% and less than 13% and sound is greater than or equal to 40 dB and less than 50 dB, the event emergency class may be set as level 2.

A method of determining an event emergency class from an event signal detected by sensors may be performed using table matching or a predetermined equation. For example, as illustrated in Table 1, an event emergency class may be calculated using a table matching method by setting an image change rate per second on a horizontal axis, by setting a magnitude of sound on a vertical axis, by dividing a block based on a level, and by allocating an event emergency level to a block for each image change rate per second and magnitude of sound.

TABLE 1

|         | 3~7% | 7~13% | 13~20% | ... |
|---------|------|-------|--------|-----|
| 40~50 dB | 1    | 2     | 3      | ... |
| 50~60 dB | 2    | 3     | 4      | ... |
| 60~70 dB | 3    | 5     | 6      | ... |
| ...     | ...  | ...   | ...    | ... |

$$\text{Event emergency class} = \left[\frac{A}{10}\right], \quad \text{[Equation 1]}$$

In Equation 1, A denotes the magnitude of sound, a unit is dB, and [ ] denotes Gauss' notation.

The table and the equation used for table matching may be stored in a predetermined storage space within the emergency analyzer 18, and contents may be corrected by an external access.

The behavior recognizer 19 refers to a constituent element configured to determine an event emergency class by analyzing a behavior or a pattern from an event signal. The behavior recognizer 19 may use relatively high power compared to the emergency analyzer 18, however, may more accurately recognize a situation. A behavior or pattern recognition algorithm used by the behavior recognizer 19 may include a variety of recognizers, for example, a hidden Markov model recognizer and a neural model recognizer. However, the present invention does not relate to the behavior or pattern recognition algorithm itself and thus, a detailed description related thereto will be omitted.

Figure 15:
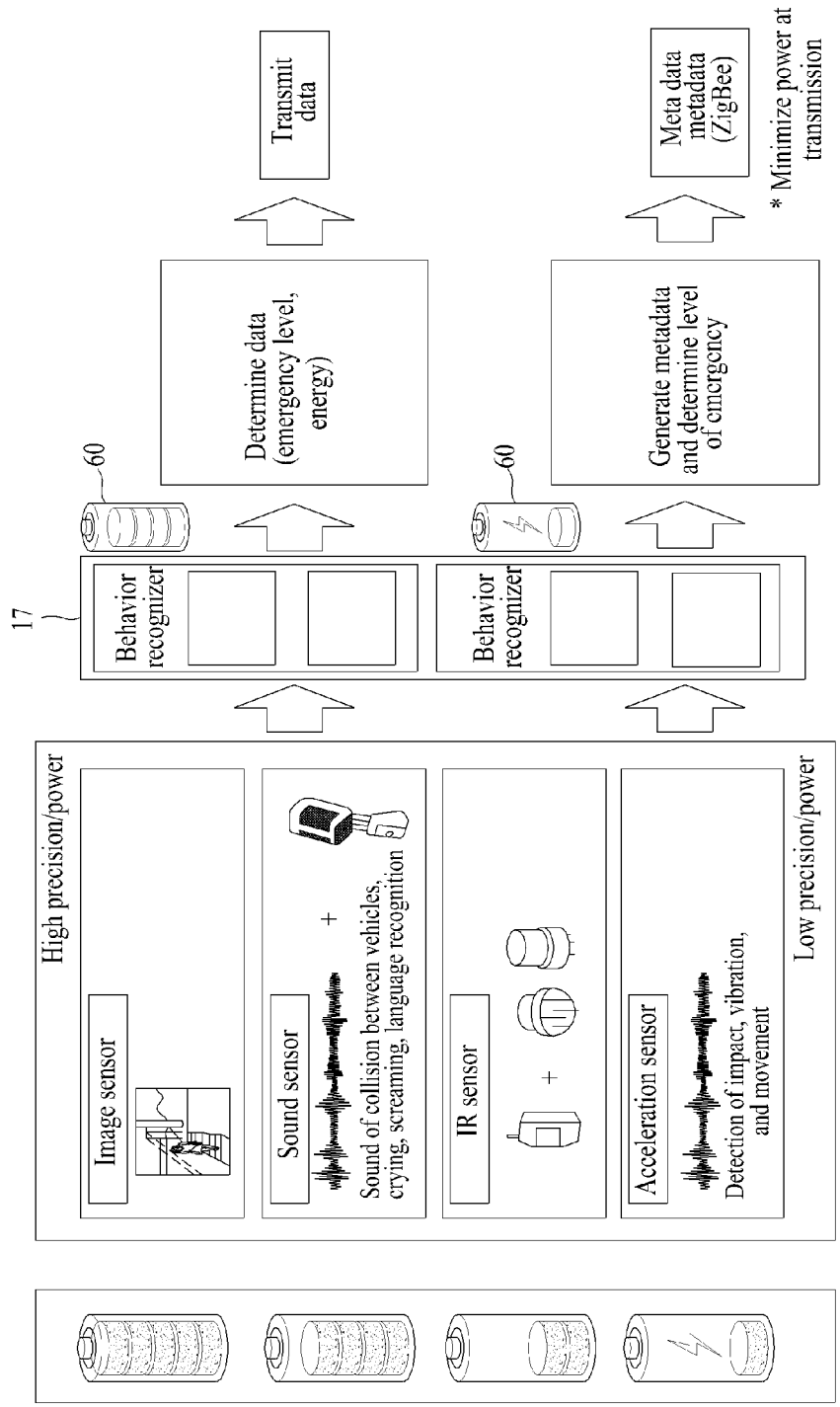
FIG. 15 illustrates a mechanism of a second event detector to determine data or to generate metadata based on a residual amount of a power source according to an embodiment of the present invention.

The second event detector 17 may generate metadata of an event signal for a case in which a network state is poor or a residual amount of the power source 60 is insufficient. FIG. 15 illustrates a mechanism of the second event detector 17 to determine data or to generate metadata based on a residual amount of the power source 60 according to an embodiment of the present invention. In the case of an event signal, particularly, an image signal, the metadata may be generated so that a monitoring system including the hierarchical event detector according to an embodiment of the present invention may recognize a situation by transmitting metadata that is summary information of the event signal for a case in which a bandwidth of a network is insufficient or a case in which energy required to transmit the image signal is insufficiently supplied form a battery. Here, the metadata may include an event emergency class.

The emergency analyzer 18 and the behavior recognizer 19 of the second event detector 170 may complementarily operate based on a residual amount of the power source 60. In detail, to reduce energy consumption, the emergency analyzer 18 may calculate an event emergency class when a residual amount of the power source 60 is less than a predetermined threshold, and the behavior recognizer 19 may calculate the event emergency class when the residual amount of the power source 60 is greater than or equal to the threshold. That is, a detection policy of securing an operation time of the hierarchical event detector of the present invention, instead of sacrificing the reliability of the event emergency class, when the residual amount of the power source 60 is determined to be insufficient, and enhancing the reliability of the event emergency class when the residual amount of the power source 60 is determined to be sufficient may be applied.

Figure 16:
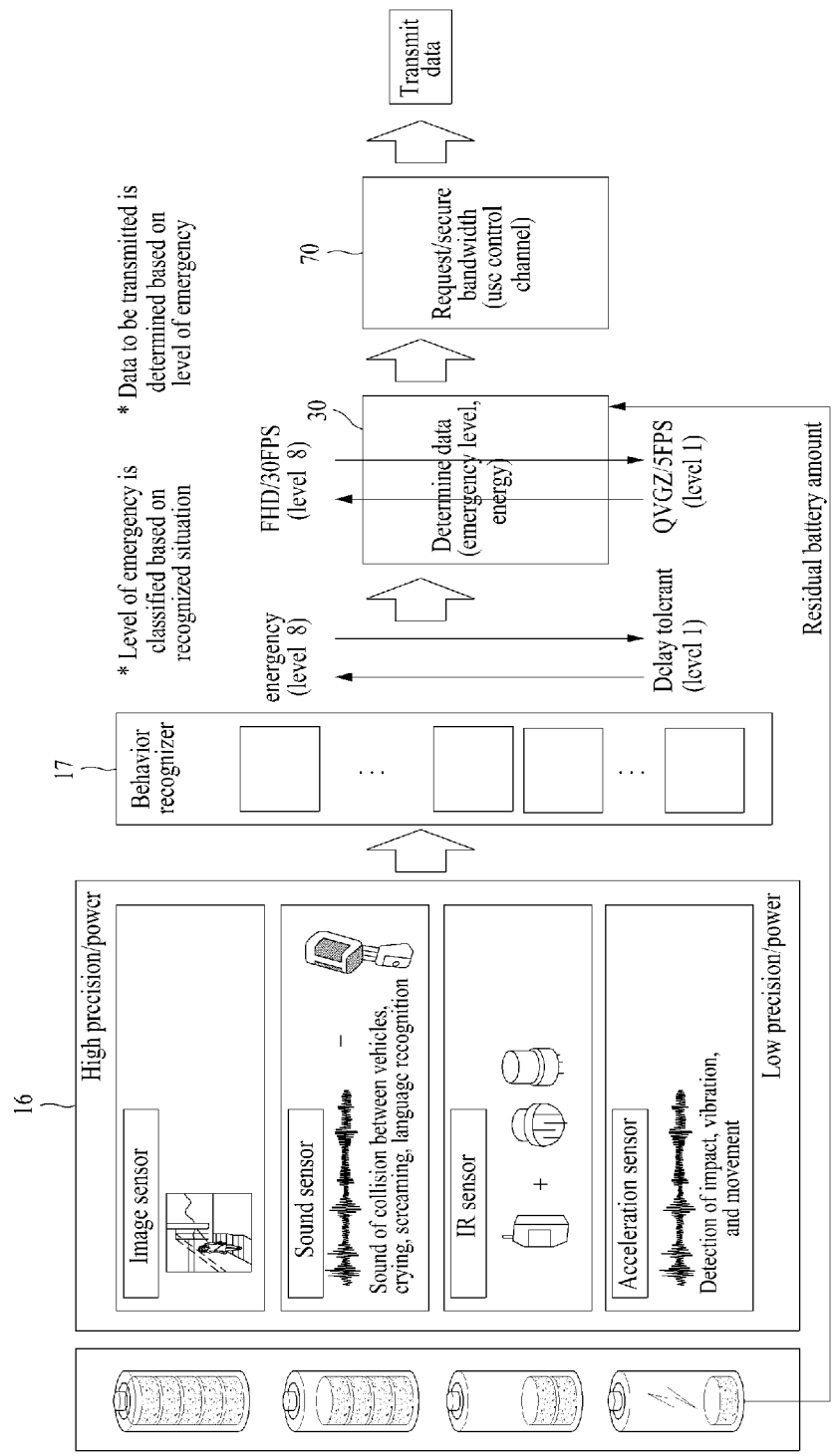
FIG. 16 illustrates an operation mechanism of a data determiner according to an embodiment of the present invention.

FIG. 16 illustrates an operation mechanism of the data determiner 30 according to an embodiment of the present invention. The data determiner 30 refers to a constituent element configured to determine a format of data to be transmitted based on an event emergency class calculated by the second event detector 17. The data determiner 30 may increase a data rate per second according to an increase in a level of the event emergency class. For example, in a case in which data to be transmitted is image data, the data determiner 30 may enable an image of a VGA (640×480) level to be transmitted when the event emergency class is relatively low as level 1 and level 2, may enable an image of an HD (1280×720) level to be transmitted when the event emergency class is intermediate as level 4 and level 5, and may transmit an image of an FHD (1920×1080) level to be transmitted when the event emergency class is level 7 and level 8, through resolution settings. Alternatively, by setting frames per second (FPS), the data determiner 30 may increase the number of frames to be transmitted per second according to an increase in a level of the event emergency class.

When the storage 20 is provided, the data determiner 30 may determine a format of data to be stored, separate from a format of data to be transmitted through the transceiver 40, and thereby enable the data to be stored in the storage 20. That is, the data determiner 30 may determine a format of data so that an amount of data to be stored increases according to an increase in a level of the event emergency class. As described above, in the case of image data, the format of data to be stored in the storage 20 may be determined based on a resolution or FPS. Determination of the format to be stored in the storage 20 using the data determiner 30 may be useful when data cannot be smoothly transmitted to an outside due to a poor network state. For example, in a case in which a bandwidth assignable from a network is insufficient, the data determiner 30 may initially transmit only metadata generated by the second event detector 17 to the network through the transceiver 40 and then transmit data stored in the storage 20 to the network through the transceiver 40 when a bandwidth assignable from the network becomes sufficient.

The transceiver 40 refers to a constituent element configured to transmit transmission data of a format determined by the data determiner 30 to an outside or to receive a command from the outside, and may include an encoder, an amplifier, an antenna, and a wired terminal. When a bandwidth of a network is insufficient or when energy required to transmit an event signal is insufficiently supplied, the transceiver 40 may transmit metadata to the network. Also, a channel priority and a bandwidth may be assigned from a primary monitoring station of the monitoring system through the transceiver 40.

The power source 60 refers to a constituent element configured to supply power to each constituent element of the first event detector 16 and the second event detector 17 of the hierarchical event detector according to an embodiment of the present invention. The power source 60 may include a primary battery such as a battery and a secondary battery such as a lead-acid battery and a lithium-ion based battery.

The storage 20 refers to a constituent element configured to store event data of a format determined by the data determiner 30. A format of event data to be stored may be subject to a type of an event signal detected by the first event detector 16. That is, the event data may be stored in a form of image data, sound data, thermal image data, and vibration signal data. When the storage 20 is configured as readable and writable storage media such as a hard disk and a flash memory, the storage 20 may be easily managed.

The network monitoring unit 70 refers to a constituent element capable of verifying an available bandwidth of a network and requesting the network for channel preemption. The network monitoring unit 70 will be described by referring again to FIG. 16. As described above, data transmission performed by the transceiver 40 depends on a network state. Accordingly, a function of verifying whether a current network state is suitable for transmitting data and securing a bandwidth may be required. An available network bandwidth may be verified by statistically analyzing a network state measured in a previous data transmission, and may be verified by occupying an actual channel in a current situation. When the verified network bandwidth is insufficient for data transmission, the network monitoring unit 70 may request a peripheral device for channel priority. In this example, in a case in which a hierarchical event detector included in the peripheral device transmits data corresponding to a relatively high level of an event emergency class, important data may be transmitted over a network by preventing channel preemption. In this case, the hierarchical event detector of the present invention may transmit metadata over a network through the transceiver 40, may temporarily store data in the storage 20, and may transmit data stored in the storage 20 over the network when a sufficient bandwidth is secured.

Figure 17A:
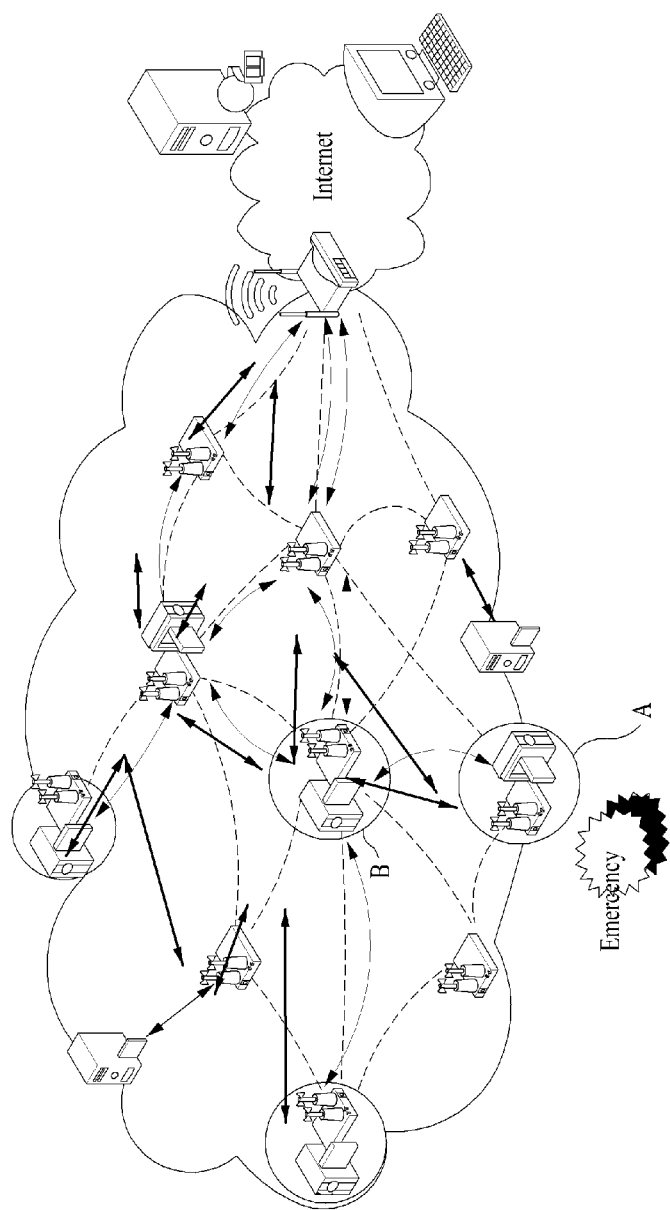
FIGS. 17A and 17B illustrate an operation mechanism of a network monitoring unit according to an embodiment of the present invention.
Figure 17B:
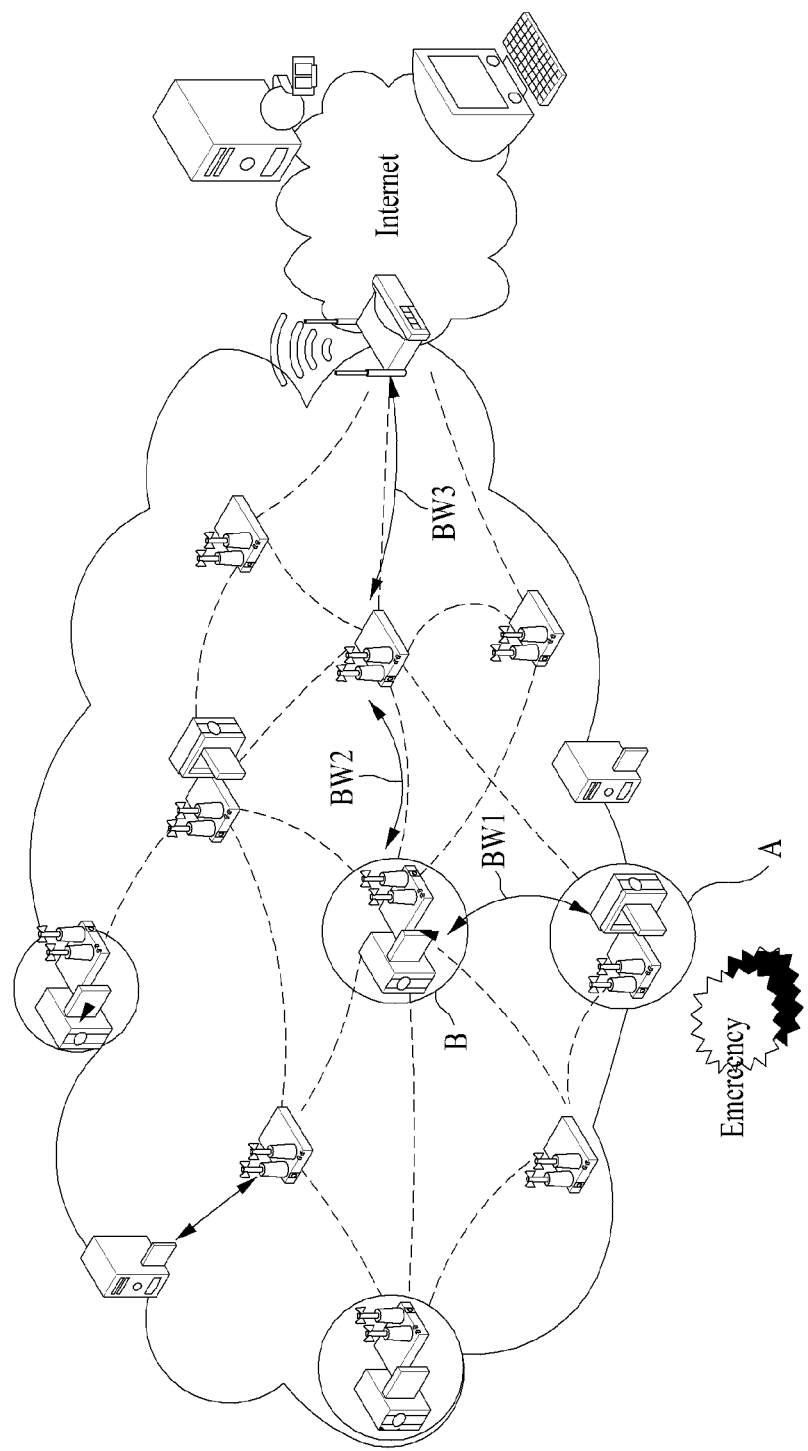

FIGS. 17A and 17B illustrate an operation mechanism of the network monitoring unit 70 according to an embodiment of the present invention. Referring to 17A and 17B, a hierarchical event detector A having to transmit an event signal corresponding to level 8 of an event emergency class may request a peripheral device B for channel preemption, thereby securing network bandwidths BW1 through BW13 reaching an external Internet network.

Desirably, a network may be configured in a double structure including a control channel using a low-power and low-speed network of ZigBee and the like and a data channel using a high-power and high-speed network of Wi-Fi and the like because a small amount of metadata and a channel preemption request signal can be sufficiently transmitted using the control channel even in a poor network state.

When an available bandwidth of a network is insufficient, the network monitoring unit may enable real-time transmission of event data by transferring information to the data determiner 30 so that the data determiner 30 may adjust a size of event data.

Figure 18:
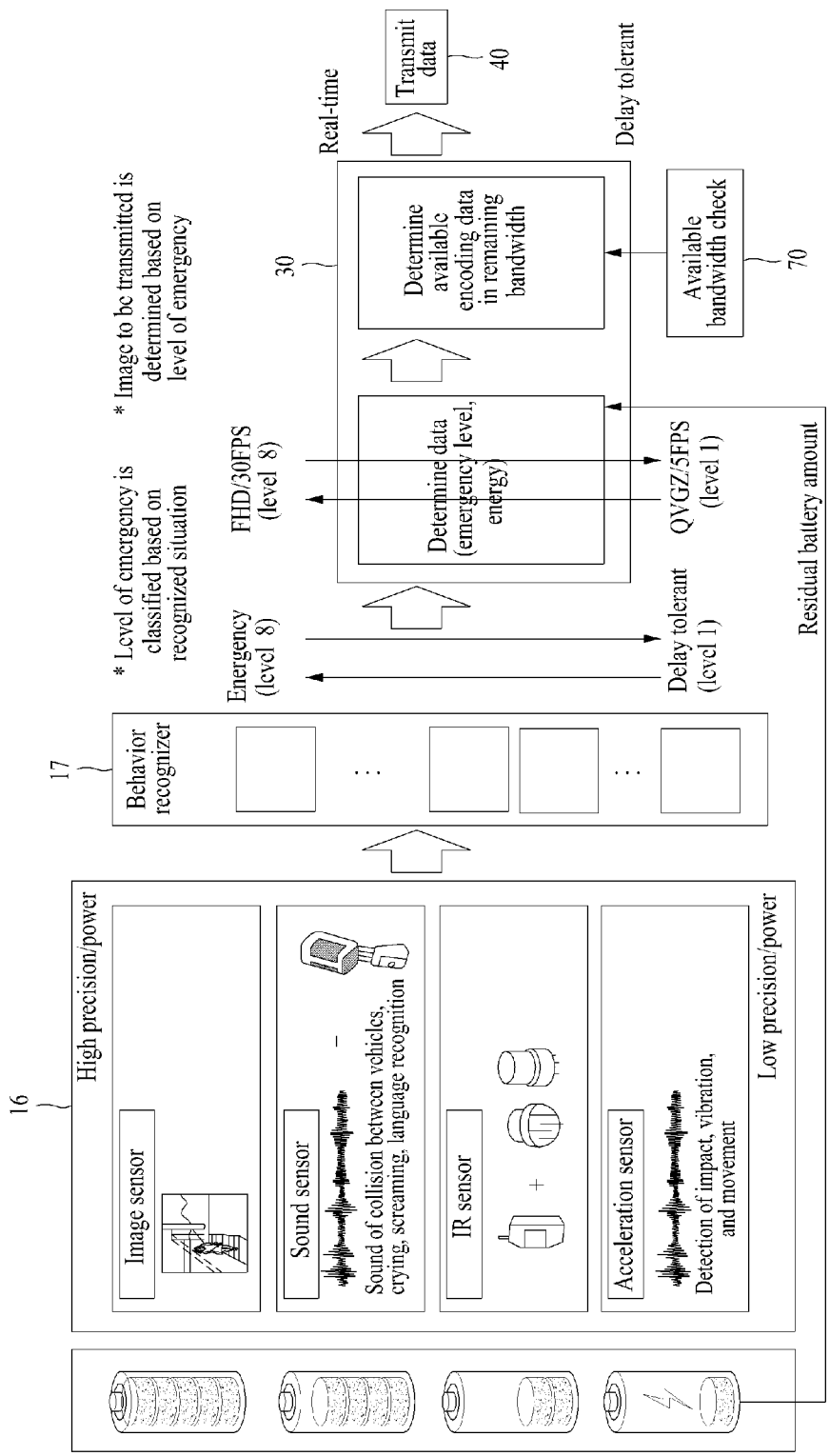
FIG. 18 illustrates an information transfer structure between a network monitoring unit and a data determiner according to an embodiment of the present invention.

FIG. 18 illustrates an information transfer structure between the network monitoring unit 70 and the data determiner 30 according to an embodiment of the present invention. For example, in a case in which image data of which transmission is determined by the data determiner 30 is 30 FPS of an HD level and a required bandwidth is about 35 Mbps and only a half of the required bandwidth, for example, 18 Mbps can be secured, the network monitoring unit 70 may transfer a message including the above information to the data determiner 30 so that the data determiner 30 may transmit data in real time using a bandwidth that is secured by decreasing a resolution of image data to be a half or by decreasing the number of frames, that is, the FPS to a half. In this case, when the primary monitoring station of the monitoring system determines that a level of the event emergency class is relatively high and accordingly, assigns a bandwidth, it is possible to transmit 30 FPS image data of an HD level originally desired to be transmitted in real time.

A data format by feedback may be determined between the first event detector 16 and the second event detector 17.

Figure 19:
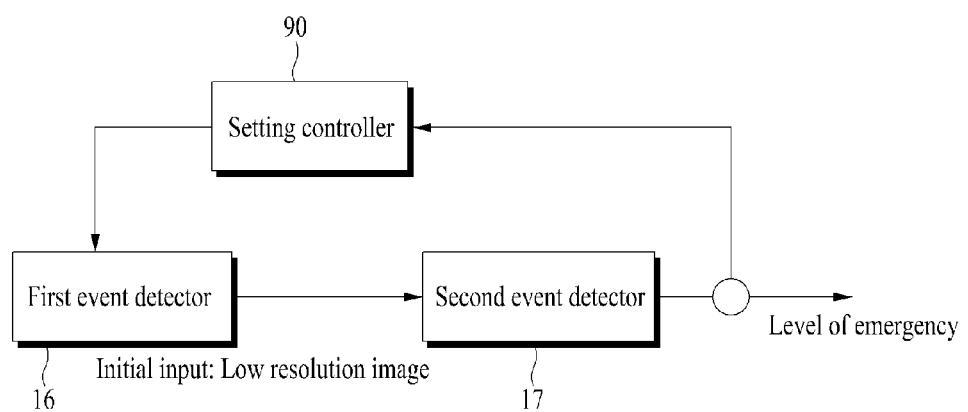
FIG. 19 illustrates a feedback structure between a first event detector and a second event detector according to an embodiment of the present invention.

FIG. 19 illustrates a feedback structure between the first event detector 16 and the second event detector 17 according to an embodiment of the present invention. Referring to FIG. 19, the second event detector 17 may feed back an event emergency class to the setting controller 90 and settings of the first event detector 16 may be changed by the setting controller 90. In general, when the first event detector 16 drives a plurality of sensors or increases quality, for example, a resolution, FPS, a gray scale level, and whether of black and white/color, of an event signal detected by each sensor, energy consumption may increase. Accordingly, the number of operating sensors may be reduced and the quality of the event signal may also be decreased by setting a default value of the first event detector 16 to a settable lowest level. A more number of sensors may be driven according to an increase in a level of the event emergency class, and the reliability of the event emergency class may be enhanced by increasing the quality of the event signal. For example, while the first event detector 16 detects that the image sensor 14 is driven at a lowest resolution, QVGA level (320×240) when a level of the event emergency class of the image sensor 14 is detected as level 3 by the second event detector 17, the image sensor 14 may be driven at a VGA level. When a level of the event emergency class is detected as level 5, the image sensor 14 may be driven at an HD level. When a level of the event emergency class is detected as level 8, the image sensor 14 may be driven at an FHD level. As described above, by increasing the quality of the event signal to be transferred to the second event detector 17 based on a level of the event emergency class, it is possible to simultaneously save energy and enhance the reliability of the event emergency class. As a level of the event emergency class decreases through the above feedback structure, the quality of the event signal detected by the first event detector 16 may be decreased, thereby achieving the significant energy saving effect. In addition, although it is described as an example of a resolution, a method of changing the quality of the event signal detected by the first event detector 16 may include a variety of methods such as a method of controlling a gray scale level, a black-and-white conversion, and FPS, for example.

Hereinafter, a method of determining target data according to an embodiment of the present invention will be described. The method of determining target data may include an event signal detection operation S10 of detecting an event signal; an event emergency class determining operation S20 of calculating an event emergency class set as a plurality of levels from the event signal; and a data format determining operation S30 of determining a format of data so that a data rate per second increases as according to an increase in a level of the calculated event emergency class. As described above, in the data format determining operation S30, a data rate per second may be set to be proportional to a level of an event emergency class by controlling a resolution, FPS, a gray scale level, and whether of black-and-white/color. Accordingly, event data, for example, image data may be transmitted to be proportional to the level of the event emergency class and thus, it is possible to appropriately verify the seriousness and importance of an event situation. By preventing transmission and storage of unnecessary event data, it is possible to reduce a network bandwidth and an energy consumption amount.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A network camera, comprising:
an event detector configured to detect an event;
an image sensor configured to capture an image in response to the detected event;
a storage configured to store image data of the captured image;
a transceiver configured to transmit and receive the image data over a network;
a controller configured to control the event detector, the image sensor, the storage, and the transceiver, to select a single network mode from among a plurality of network modes based on whether power is supplied from an outside, and to configure the network based on the selected network mode; and
a power source configured to supply the power to the event detector, the image sensor, the storage, the transceiver, and the controller,
wherein the transceiver comprises a first sub-transceiver for a low-power and low-speed network and a second sub-transceiver for a high-power and high-speed network,
wherein the first sub-transceiver transmits a beacon message indicating a state of the network camera to at least one of neighboring network camera,
wherein the beacon message includes information on a residual battery amount of the at least one of neighboring network camera,
wherein the controller selectively adopts a path based on the information on the residual battery amount of the at least one of neighboring network camera.

2. The network camera of claim 1, wherein the controller is configured to select a single network mode from among a low-power and low-speed network mode and a high-power and high-speed network mode based on whether the power is supplied from the outside, and to configure the network based on the selected network mode.

3. The network camera of claim 1, wherein the controller is configured to use a multichannel in response to an increase in an amount of data transmitted and received.

4. The network camera of claim 1, wherein the controller is configured to transmit the image data to a sink or a gateway through a multipath.

5. The network camera of claim 1, wherein the controller is configured to maintain a low-power and low-speed network mode while the power is not supplied to a streetlight and to switch from the low-power and low-speed network mode to a high-power and high-speed network mode when the image data is to be transmitted.

6. The network camera of claim 1, wherein the power source comprises a power supply module configured to be directly supplied with the power from a wire lead in a streetlight and a battery module configured to store the power.

* * * * *